United States Patent
Levergood et al.

(10) Patent No.: US 7,272,639 B1
(45) Date of Patent: *Sep. 18, 2007

(54) INTERNET SERVER ACCESS CONTROL AND MONITORING SYSTEMS

(75) Inventors: Thomas Mark Levergood, Hopkinton, MA (US); Lawrence C. Stewart, Burlington, MA (US); Stephen Jeffrey Morris, Westford, MA (US); Andrew C. Payne, Lincoln, MA (US); George Winfield Treese, Newton, MA (US)

(73) Assignee: Soverain Software LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/005,479

(22) Filed: Jan. 12, 1998

Related U.S. Application Data

(63) Continuation of application No. 08/474,096, filed on Jun. 7, 1995, now Pat. No. 5,708,780.

(51) Int. Cl.
 *G06F 15/16* (2006.01)
(52) U.S. Cl. .................. 709/218; 709/203; 709/229
(58) Field of Classification Search ............... 709/217, 709/218, 219, 225, 229
 See application file for complete search history.

(56) References Cited

U.S. PATENT DOCUMENTS

| | | |
|---|---|---|
| 4,305,059 A | 12/1981 | Benton |
| 4,528,643 A | 7/1985 | Freeny, Jr. |
| 4,529,870 A | 7/1985 | Chaum |
| 4,578,530 A | 3/1986 | Zeidler ..................... 178/22.09 |
| 4,734,858 A | 3/1988 | Schlafly |
| 4,755,940 A | 7/1988 | Brachtl et al. |
| 4,759,063 A | 7/1988 | Chaum |
| 4,759,064 A | 7/1988 | Chaum |
| 4,775,935 A | 10/1988 | Yourick |
| 4,795,890 A | 1/1989 | Goldman |
| 4,799,156 A | 1/1989 | Shavit et al. |
| 4,812,628 A | 3/1989 | Boston et al. |
| 4,827,508 A | 5/1989 | Shear |
| 4,891,503 A | 1/1990 | Jewell |

(Continued)

FOREIGN PATENT DOCUMENTS

EP 0172670 2/1986

(Continued)

OTHER PUBLICATIONS

T. Berners-Lee et al., RFC 1738: Uniform Resource Locators (URLs), Network Working Group, Dec. 1994, pp. 1-25.*

(Continued)

*Primary Examiner*—Patrice Winder
(74) *Attorney, Agent, or Firm*—Jones Day

(57) ABSTRACT

This invention relates to methods for controlling and monitoring access to network servers. In particular, the process described in the invention includes client-server sessions over the Internet. In this environment, when the user attempts to access an access-controlled file, the server subjects the request to a secondary server which determines whether the client has an authorization or valid account. Upon such verification, the user is provided with a session identification which allows the user to access to the requested file as well as any other files within the present protection domain.

79 Claims, 7 Drawing Sheets

U.S. PATENT DOCUMENTS

| | | | |
|---|---|---|---|
| 4,922,521 | A | 5/1990 | Krikke et al. |
| 4,926,480 | A | 5/1990 | Chaum |
| 4,935,870 | A | 6/1990 | Burk, Jr. et al. |
| 4,947,028 | A | 8/1990 | Gorog |
| 4,947,430 | A | 8/1990 | Chaum |
| 4,949,380 | A | 8/1990 | Chaum |
| 4,972,318 | A | 11/1990 | Brown et al. |
| 4,977,595 | A | 12/1990 | Ohta et al. ............... 380/24 |
| 4,982,346 | A | 1/1991 | Girouard et al. |
| 4,987,593 | A | 1/1991 | Chaum |
| 4,991,210 | A | 2/1991 | Chaum |
| 4,992,940 | A | 2/1991 | Dworkin |
| 4,996,711 | A | 2/1991 | Chaum |
| 5,025,373 | A | 6/1991 | Keyser, Jr. et al. |
| 5,060,153 | A | 10/1991 | Nakagawa |
| 5,077,607 | A | 12/1991 | Johnson et al. |
| 5,105,184 | A | 4/1992 | Pirani et al. |
| 5,220,501 | A | 6/1993 | Lawlor et al. |
| 5,247,575 | A | 9/1993 | Sprague et al. |
| 5,276,736 | A | 1/1994 | Chaum |
| 5,305,195 | A | 4/1994 | Murphy |
| 5,311,594 | A | 5/1994 | Penzias |
| 5,319,542 | A | 6/1994 | King, Jr. et al. |
| 5,321,751 | A | 6/1994 | Ray et al. |
| 5,336,870 | A | 8/1994 | Hughes et al. |
| 5,341,429 | A | 8/1994 | Stringer et al. |
| 5,347,632 | A * | 9/1994 | Filepp et al. ............... 709/202 |
| 5,351,186 | A | 9/1994 | Bullock et al. |
| 5,351,293 | A | 9/1994 | Michener et al. |
| 5,383,113 | A | 1/1995 | Kight et al. |
| 5,414,833 | A | 5/1995 | Hershey et al. |
| 5,475,585 | A | 12/1995 | Bush |
| 5,521,631 | A | 5/1996 | Budow et al. |
| 5,530,852 | A | 6/1996 | Meske, Jr. et al. |
| 5,535,229 | A | 7/1996 | Hain, Jr. et al. |
| 5,544,322 | A * | 8/1996 | Cheng et al. ............... 709/229 |
| 5,557,516 | A | 9/1996 | Hogan |
| 5,557,518 | A | 9/1996 | Rosen |
| 5,557,798 | A | 9/1996 | Skeen et al. |
| 5,560,008 | A * | 9/1996 | Johnson et al. ............. 709/300 |
| 5,577,209 | A | 11/1996 | Boyle et al. |
| 5,590,197 | A | 12/1996 | Chen et al. |
| 5,592,378 | A | 1/1997 | Cameron et al. |
| 5,594,910 | A | 1/1997 | Filepp et al. |
| 5,596,642 | A | 1/1997 | Davis et al. |
| 5,596,643 | A | 1/1997 | Davis et al. |
| 5,604,802 | A | 2/1997 | Holloway |
| 5,621,797 | A | 4/1997 | Rosen |
| 5,623,547 | A | 4/1997 | Jones et al. |
| 5,623,656 | A | 4/1997 | Lyons |
| 5,642,419 | A | 6/1997 | Rosen |
| 5,664,110 | A | 9/1997 | Green et al. |
| 5,664,111 | A | 9/1997 | Nahan et al. |
| 5,694,551 | A | 12/1997 | Doyle et al. |
| 5,708,780 | A | 1/1998 | Levergood et al. |
| 5,710,884 | A * | 1/1998 | Dedrick ..................... 709/217 |
| 5,715,314 | A | 2/1998 | Payne et al. ................ 380/24 |
| 5,724,424 | A | 3/1998 | Gifford |
| 5,727,164 | A | 3/1998 | Kaye et al. |
| 5,734,719 | A | 3/1998 | Tsevdos et al. |
| 5,761,662 | A * | 6/1998 | Dasan ........................ 707/10 |
| 5,768,521 | A * | 6/1998 | Dedrick ..................... 709/219 |
| 5,774,670 | A * | 6/1998 | Montulli .................... 709/227 |
| 5,784,565 | A | 7/1998 | Lewine |
| 5,806,077 | A | 9/1998 | Wecker |
| 5,812,776 | A | 9/1998 | Gifford |
| 5,819,092 | A | 10/1998 | Ferguson et al. |
| 5,826,241 | A | 10/1998 | Stein et al. |
| 5,826,242 | A * | 10/1998 | Montulli .................... 705/27 |
| 5,848,399 | A | 12/1998 | Burke |
| 5,895,454 | A | 4/1999 | Harrington ................ 705/26 |
| 5,897,622 | A | 4/1999 | Binn et al. |
| 5,909,492 | A | 6/1999 | Payne et al. |
| 5,920,847 | A | 7/1999 | Kolling et al. |
| 6,006,199 | A | 12/1999 | Berlin et al. |
| 6,023,683 | A | 2/2000 | Johnson et al. |
| 6,041,316 | A | 3/2000 | Allen |
| 6,049,785 | A | 4/2000 | Gifford |
| 6,134,592 | A * | 10/2000 | Montulli .................... 709/227 |
| 6,195,649 | B1 | 2/2001 | Gifford |
| 6,199,051 | B1 | 3/2001 | Gifford |
| 6,205,437 | B1 | 3/2001 | Gifford |
| 6,449,599 | B1 | 9/2002 | Payne et al. |
| 6,708,157 | B2 | 3/2004 | Stefik et al. |

FOREIGN PATENT DOCUMENTS

| | | |
|---|---|---|
| EP | 0 456 920 | 11/1991 |
| EP | 0542298 B1 | 5/1993 |
| EP | 0 645 688 | 3/1995 |
| GB | 2102606 | 2/1983 |
| JP | 3278230 | 12/1991 |
| JP | 410191 | 1/1992 |
| JP | 05-158983 | 6/1993 |
| JP | 5274275 | 10/1993 |
| JP | 6162059 | 6/1994 |
| JP | 6291776 | 10/1994 |
| WO | WO 91/16691 | 10/1991 |
| WO | WO 93/10503 | 5/1993 |
| WO | WO 94/03859 | 2/1994 |

OTHER PUBLICATIONS

Jose Kahan, A distributed Authorization Model for WWW, http://www.isoc.org/, May 1995, 16 pages.*

Jose Kahan, A capability-based authorization model for the World-Wide Web, Apr. 1995, 14 pages.*

Scott Anderson et al., Sessioneer: Flexible Session Level Authentication with Off the Shelf Servers and Clients, The Third Intern'l WWW Conf., Apr. 1995, 7 pages.*

Bjorn N. Freeman-Benson, Using the Web to Provide Private Information, First international Conference on the World Wide Web, WWW94, May 1994, 5 pages.*

Trip et al., "Cookies" (Client-side persistent information) and their use, Netscape Technical Note 20019, Netscape Communications Corp, Oct. 1995.*

Jose Kahan, A Distributed Authorization Model for WWW, May 1995, http://www.isoc.org/HMP/PAPER/107/html/paper.*

Netscape Products, "Open and Secure Internet Software" INTERNET, Sep. 18, 1995, pp. 1-2.

Merchant System: Overview, "Netscape Merchant System Data Sheet" INTERNET, Sep. 18, 1995, pp. 1-3.

Internet Applications Customer Showcase, "Customer Showcase" INTERNET, Sep. 18, 1995., pp. 1-2.

The Server-Application Function and Netscape Server API, "The Netscape Server API" Netscape Products INTERNET, Sep. 18, 1995, pp. 1-11.

The Object-Oriented Paradigm of Server Configuration, "The Object-Oriented Paradigm of Server Configuration" INTERNET, Sep. 18, 1995, pp. 102.

Verisign Redirection Information, "Important Announcement" INTERNET, Sep. 18, 1995, p. 1.

Lou Montulli, Electronic Mail to multiple recipients of the www-talk list (www-talk@www10.w3.org) on "Session Tracking" (omi.mail.www-talk, Apr. 18, 1995).

PR: Digital IDs for Open Market's Secure WebServer, "Press Release, VeriSign, Inc. to Provide Digital IDs for Open Market's Secure WebServer" INTERNET, Sep. 18, 1995, pp. 1-2.

PR: Online Security Solutions, "VeriSign, Inc. Adds the Missing Component to' Online Security Solutions" INTERNET, Sep. 18, 1995, pp. 1-2.

The SSL Protocol, INTERNET, Sep. 18, 1995, pp. 1-18.

IStore, "Netscape Istore Data Sheet" INTERNET, Sep. 18, 1995, pp. 1-2.

Ramanathan, Srinivas, et al., "Architectures for Personalized Multimedia," IEEE Multimedia, vol. 1, No. 1, Computer Society, pp. 37-46, 1994.

Choudhury, Abhijit K., et al., "Copyright Protection for Electronic Publishing Over Computer Networks," IEEE Network, The Magazine of Computer Communications, vol. 9, No. 3, pp. 12-20, May 1995.

"Cookies and Privacy FAQ," http://search.netscape.com/assist/security/faqs/cookies.html (Jan. 9, 1998 at 4:29 p.m.).

"Persistent Client State HTTP Cookies," http://search.netscape.com/newsref/std/cookie_spec.html (Jan. 9, 1998 at 4:28 p.m.).

"HTTP State Management Mechanism," http://www.internic.net/rfc/rfc2109.txt (Jan. 9, 1998 at 4:30 p.m.).

Peterson, Larry L. "A Yellow-Pages Service for a Local-Area Network", ACM Proceedings of the ACM SIGCOMM 87 Workshop, ACM Press, 1988, pp. 235-242.

"Here it is, World" internet postings to comp.infosystems.www.users discussion list re: Mosaic Netscape (Oct. 13, 1994—Oct. 17, 1995) available at: http://groups.google.com/group/comp/infosystems.www.users/browse_thread/thread/3666fe4e21b3a9e2/9a210e5f72278328?lnk=st&rnum=5&hl=en#9a210e5f72278328.

"Netscape 0.93 Setup Questions" internet postings to comp.infosystems.www.misc discussion list re: Mosaic Netscape (Nov. 21, 1994-Nov. 25, 1994) available at: http://groups.google.com/group/comp.infosystems.www.misc/browse_thread/thread/da4e82efc6512f67/8dabc347291409d5?Ink=st&rnum=1&hl=en#8dabc347291409d5.

"Netscape and Cookies" internet postings to comp.infosystems.www.users discussion list re: Mosaic Netscape (Dec. 11, 1994-Dec. 13, 1994) available at: http://groups.google.com/group/comp.infosystems.www.users/browse_thread/thread/5347cb89bbae572b/3583cab5e6c13e94?Ink=st&rnum=3&hl=en#3583cab5e6c13e94.

"Cookies.txt" internet postings to comp.infosystems.www.users discussion list re: Mosaic Netscape (Dec. 23, 1994-Dec. 27, 1994) available at: http://groups.google.com/group/comp.infosystems.www.users/browse_thread/thread/613e81948e9cf6e4/134ade72dfc1c58d?Ink=st&rnum=2&hl=en#134ade72dfc1c58d.

"How to get statefull HTML documents" internet postings to comp.infosystems.www.misc discussion list (Jun. 24, 1994-Jun. 25, 1994) available at: http://groups.google.com/group/comp.infosystems.www.misc/browse_thread/thread/fd304fedb645529a/b8f6dab2aa73ae71?Ink=st&rnum=7&hl=en#b8f6dab2aa73ae71.

"How to add state info to a form" internet postings to comp.infosystems.www.providers discussion list (Jun. 30, 1994 - Jul. 1, 1994) available at: http://groups.google.com/group/comp.infosystems.www.providers/browse_thread/thread/2acad6cdc8ebb8a/bf368e630add2c94?Ink=st&rnum=8&hl=cn#bf368e630add2c94.

"Transactional Services on WWW" internet postings to comp.infosystems.www discussion list (May 12, 1994 - Jun. 1, 1994) available at: http://groups.google.com/group/comp.infosystems.www/brows_thread/thread/bf430e6df8e6e7d/8ed77a97f5d0b9d6?Ink=st&hl=en#8ed77a97f5d0b9d6.

Dan Aronson, "access and session control" posting to www-talk discussion list (Sep. 14, 1994) available at: http://1997.webhistory.org/www.lists/www-talk.1994q3/0901.html.

Rick Troth, "access and session control" (Sep. 15, 1994) available at: http://1997.webhistory.org/www.lists/www-talk.1994q3/0923.html.

alain@hyperman.co.il, "Identifying Mosaic session" posting to www-talk discussion list (Dec. 20, 1994) available at http://1997.webhistory.org/www.lists/www-talk.1994q4/1098.html.

Joe English, "Re: Identifying Mosaic session", posting to www-talk discussion list (Dec. 20, 1994 available at: http://1997.webhistory.org/www.lists/www-talk.1994q4/1109.html.

Steven Majewski, "Identifying Mosaic session" posting to www-talk discussion list (Dec. 20, 1994) available at: http://19970webhistory.org/www.lists/www-talk.1994q4/1111.html.

Nick Arnett, "Statelessness" posting to www-talk discussion list (May 16, 1994) available at: http://1997.webhistory.org/www.lists/www-talk.1994q2/0562.html.

Jared Rhine, "Statelessness" Posting to www-talk discussion list (May 16, 1994) available at: http://1997.webhistory.org/www.lists/www-talk.1994q2/0563.html.

Simon Sper, "Statelessness" posting to www-talk discussion list (May 17, 1994) available at: http://1997.webhistory.org/www.lists/www-talk.1994q2/0579.html.

Jim McBeath, "Statelessness" posting to www-talk discussion list (May 27, 1994) available at: http://1997.webhistory.org/www.lists/www-talk.1994q2/0683.html.

Phillip Hallam-Baker, "Statelessness" posting to www-talk discussion list (May 30, 1994) available at: http://1997.webhistory.org/www.lists/www-talk.1994q2/0705.html.

Pitkow, J. E., and Recker, M. M., "Using the Web as a Survey Tool: Results from the Second WWW User Survey," http://www.igd.fhg.de/www/www95/papers/79/survey/survey_2_paper.html, Apr. 1995.

Gifford, David K., "Notes on Community Information Systems," MIT/LCS/TM-419, Dec. 10, 1989, pp. 1-5.

Chaum, D., "Achieving Electronic Privacy," *Scientific American*, Aug. 1992, pp. 96-101.

Neuman, B. C. , "Proxy-Based Authorization and Acounting for Distributed Systems," *Proceedings on the 13th International Conference on Distributed Computing Systems*, Pittsburgh, May 1993.

Anderson, R., "Why Cryptosystems Fail," *1st Conf.—Computer & Comm. Security*, 1993-11/93—VA, USA, pp. 215-227.

Abadi, M., et al., "Authentication and Delegation with Smartcards," Oct. 1990, 30 pgs.

Rivest, R., "The MD5 Message-Digest Algorithm," *MIT Laboratory for Computer Science and RSA Data Security, Inc.*, Apr. 1992.

Voydock, V., et al., "Security Mechanisms in High-Level Network Protocols," *Computing Surveys*, vol. 15, No. 2, Jun. 1983, pp. 135-171.

Gligor, V.D., "Object Migration and Authentication," *IEEE Transactions on Software Engineering*, vol. SE-5, No. 6, Nov. 1979, pp. 607-611.

Chaum, D.L., et al., "Implementing Capability-Based Protection Using Encryption," *Electronics Research Laboratory*, Jul. 1978, pp. 1-10.

"Mosaic Communications Unveils Network Navigator and Server Software for the Internet," *Mosaic Communications Press Release*, Sep. 1994, 3 pgs.

Rescorla, E., et al., "The Secure Hypertext Transfer Protocol," *Enterprise Integration Technologies*, Jun. 1994, 22 pgs.

Bellecore Internal E-Mail, Nov. 24, 1993.

Bina, E., et al., "Secure Access to Data Over the Internet," 1994 IEEE, pp. 99-102, Sep. 1994.

Kiuchi, T., et al., "C-HTTP—The Development of a Secure, Closed HTTP-based Network on the Internet," 1996 IEEE, pp. 64-75.

Pitkow, J.E., et al., "Webviz: A Tool for World-Wide Web Access Log Analysis." May 1994, pp. 271-277.

Lim, Jong-Gyun, et al., "Using Coollists to Index HTML Documents in the Web," http://www.ncsa.uiuc.edu/SDG/Tt94/Proceedings/Searching/lim/coollist/htm, pp. 1-8, Oct. 1994.

Sedayao, J., "*Mosaic* Will Kill My Network!—Studying Network Traffic Patterns of Mosaic Use," http://www.ncsa.uiuc.edu/sSDG/Tt94/p...gs/dday/sedayao_trat_paper.htm, pp. 1-7, Oct. 1994.

Catledge, L.D., et al., "Characterizing Browsing Strategies in the World-Wide Web," http://igd.thg.de/archive/1995_.../Userpatterns.Paper4.formatted.htm, pp. 1-10, Apr. 1995.

57 USPQ2d, "Amazon.com, Inc. v. Barnesandnoble.com, Inc." pp. 1746-1763, Feb. 2001.

Amazon.com's Reply in Support of Renewed Motion to Stay, dated Apr. 25, 2005, pp. 1-5.

Deposition of G. Winfield Treese, dated Oct. 27, 2004.

Deposition of Glenn Arthur Hauman eith Exhibits (Oct. 28, 2004).

Jolot Claim Construction Chart (Patent Local Rue 4-50)) filed Dec. 27, 2004 with Appendix A.

Memorandum Opinion dated Apr. 7, 2005.

Motion to Stay [Renewed] by Amazon.com (Attachments: # 1 Affidavit # 2 Text of Proposed Order) (Nelson, Justin) (Entered: Apr. 5, 2005).

Notice by Amazon.com re Answer to Amended Complaint, Counterclaim Of Rejection Of Claims 1-45 of U.S. Patent No. 5,708,780, dated Mar. 25, 2005, pp. 1-3, with Exhibit A.
Order Denying Amazon's Motion to Stay Proceedings Pending Completion of the Reexamination, dated Apr. 20, 2005.
Soverain's Disclosure of Asserted Claims and Preliminary Infringement Contentions dated Jun. 3, 2004.
Soverain's Opposition to Amazon's Renewed Motion to Stay, dated Apr. 20, 2005, pp. 1-12.
Soverain's Reply to Amazon.Com's Amended Counterclaims, dated Jan. 14, 2005.
Soverain's Reply to Response to Motion re: Motion to Stay, dated Apr. 26, 2005.
Soverain's Answer to Counterclaim (Amazon's Third Ameneded Counterclaim) by Soverain Software LLC. (Seraphine, Jennifer) (Entered: Mar. 17, 2005).
Soverain's Fourth Supplemental Responses to Amazon's First Set of Interrogatores (Nos. 1-14) dated Mar. 21, 2005.
Soverain's Responses to Amazon's First Set of Requests for Admission to Plaintiff Soverain Software (Nos. 1-100) dated Mar. 21, 2005.
Soverain's Responses to Interrogatory Nos. 22, 23, 26 and 36 of Amazon's Third Set of Interrogatores (Nos. 17-368) dated Mar. 21, 2005.
Third Supplement to Defendant Amazon's Initlal Disclosures, dated Mar. 4, 2005.
Transcript of the Markman Hearing Before the Honarable Leonard David United States District Judge, Jan. 6, 2005.
VideoTaped Deposition of Andrew Payne dated Mar. 11, 2005.
Videotaped Deposition of Glenn Crocker with Exhibits (Mar. 10, 2005).
VideoTaped Deposition of Glenn Trewitt dated Jan. 25, 2005 (2 parts).
VideoTaped Deposition of Mark Levergood dated Mar. 8, 2005 (2 Parts).
VideoTaped Deposition of Stephen Morris dated Mar. 9, 2006.
Amazon.com Inc's Unopposed Motion for Leave to Amend Its Answer to Include Allegations Regarding Stuff.com, dated May 18, 2005, pp. 1-9.
Amazon.com's Motion for Partial Summary Judgment that claims are Indefinite under 35 U.S.C 112, dated Jun. 10, 2005, pp. 1-20.
Amazon.com's Motion for Partial Summary Judgment that 314 claims 34-39, '492 claims 17-18 and 35-36, and '780 claims 1, 4, and 22-24 are invalis under 35 U.S.C. 102, dated Jun. 10, 2005, pp. 1-30.
Declaration of James E. Geringer in Support of Amazon.com, Inc's Motion for Leave to Amend its Answer and Counterclaims to Add Stuff.com, dated May 18, 2005, pp. 1-3.
Deposition of Glenn M. Trewitt with Exhibits (Jan. 25, 2005).
Deposition of Joshua Smith with Exhibits (Mar. 2, 2005).
Deposition of Michael Lazzaro with Exhibits (Mar. 9, 2005).
Deposition of Thomas Soulanille with Exhibits (Mar. 14, 2005).
Exhibit 1 of Geringer Declaration: Excerpts of Deposition of Michael Kuniavsky. (Feb. 22, 2005).
Exhibit 2 of Geringer Declaration: E-mail from Brooks Cutter to Mike Kuniavsky (Jun. 14, 1994).
Exhibit 3 of Geringer Declaration: Excerpts of Deposition of Richard Boake. (Mar. 21, 2005).
Exhibit 5 of Geringer Declaration: Excerpts of Deposition of Andrew Payne, (Mar. 11, 2005).
Exhibit 6 of Geringer Declaration: E-mail from Andrew Payne to Winfield Treese et al. (Jun. 15, 1994).
Exhibit 7 of Geringer Declaration: Exceprts of Deposition of Winfield Treese (Oct. 27, 2004).
Exhibit 8 of Geringer Declaration: Amazon.com, Inc.'s [Proposed] fourth Amended Answer, Affirmative Defenses, and Counterclaims to Soverain Software LLC's Complaint (Redlined Version) (May 18, 2005).
Supplemental Disclosure of Preliminary Invalidity Contentions by Amazon and Gap dated Jul. 26, 2004.
Videotaped Depostion of Guy Henry Haskin with Exhibits (Mar. 18, 2005).
Videotaped Deposition of Kevin Ming-Wei Kadla Hughes with Exhibits (Mar. 21, 2005).
Videotaped Desposition of Michael Kuniavsky with Exhibits (Feb. 22, 2005).
Videotaped Deposition of Phillip Hallam-Baker with Exhibits (Mar. 11, 2005).
Videotaped Deposition of Robert Allen Olson with Exhibits (Mar. 3, 2005).
"Advanced Electronic Credit Authorization Through the Amherst Group SNET", News Release, pp. 1-2, Dec. 7, 1987.
"CompuServ Videotex Network Offers Marketing Research Service, Ad Test." Marketing Netws, Nov. 25, 1983, p.21.
Electronic In-Home Shopping: "Our Stores are Always Open", Chain Store Age Executive, Mar. 1985, pp. 111,116.
"Mall Offers Holiday Treat for Hackers," Advertising Age, Nov. 13, 1985, p. 76.
"Redcoats Join Communications Fight," Industry Week, Feb. 22, 1982, pp. 108-109.
"Suddenly, Videotex is Finding an Audience," Business Week, Oct. 19, 1987, pp. 92-94.
"Taking Advantage of the Past," Advertising Age, Apr. 11, 1983, pp. M36-37.
Allen & Hamilton, How to Buy Information with a First Virtual Account, Apr. 11, 1994, pp. 3-71.
American National Standard: "Financial Institution Retail Message Authentication"; ANSI X9, 19: 1986.
American National Standard; "Interchange Message Specification for Debit and Credit Card Message Exchange Among Financial Institutions"; ANSI X9.2; 1988.
Anderson, Ross J.; "UEPS—A Second Generation Electronic Wallet"; Proc. of the Second European Symposium on Research in Computer Security (ESORICS); Toulusse, France; pp. 411-418, 1992.
Bender, M.; "EFTS: Electronic Funds Transfer Systems"; Kennikat Press: Port Washington, New York; pp. 43-46; 1975
Beutelspacher, et al, "Payment Applications with Multifunctional Smart Cards," Smart Card 2000: The Future of IC Cards, Oct. 1987, pp. 95-101.
Bos et al.; "SmartCash: A Practical Electronic Payment System"; pp. 1-8; Aug. 1990.
Burk et al.; "Value Exchange Systems Enabling Security and Unobservability"; Computers & Security, 9; pp. 715-721; 1990.
Burk, et al, "Digital Payment Systems Enabling Security and Observability," Computers & Security, 1989, pp. 399-415.
Case Study: The CIRRUS Banking Network; Comm. ACM 8, 28' pp. 797-8078; Aug. 1985.
CCITT Blue Book, vol. VIII; pp. 48-81 Nov. 14-25, 1988.
Chaum et al.; "Untraceable Electronic Cash"; Advances in Cryptology; pp. 319-327; 1988.
Cohen, Danny; "Computerized Commerce"; ISI Reprint Series IS/RS-89-243; Oct. 1989; Reprinted from Information Processing 89, Proceedings of the IFIP World Computer Congress, held Aug. 28-Sep. 1, 1989.
Cohen, Danny; "Electronic Commerce"; University of Southern California Information Sciences Institute, Research Report ISI/RR-89-244; Oct. 1989.
Compuserve International: Compuserve Information Service Users Guide: pp. 109-114; 1986.
Computer Fraud & Security Bulletin, "Underlying Security Mechanisms," Mar. 1997.
Computer Shopper: "Internet for Profit"; pp. 180-182, 190-192, 522-528, 532, 534; Nov. 1994.
Consumers Plugging into New Electronic Mall, Advertising Age, Mar. 4, 1985, p. 74.
Damgard, "Payment Systems and Credential Mechanisms with Provable Security Against Abuse by Individuals," Advances in Cryptology-CRYPTO '88, 1988, pp. 328-325.
Davies, D.W. and Price, W.L.; "Security for Computer Networks: An Introduction to Data Security in Teleprocessing and Electronic Funds Transfer"; John Wiley & Sons; Dec. 5, 1985; pp. 304-336.
Dukach, Semyon; "SNPP: A Simple Network Payment Protocol"; MIT Laboratory for Computer Science; Cambridge, 1993.
Even et al.; "Electronic Wallet"; pp. 383-386; 1983.
Ferrarini, "Direct Connections for Software Selections," Business Computer Systems, Feb. 1984, pp. 35-38.

Fujioka, et al, "ESIGN: An Efficient Digital Signature Implementation for Smart Cards," Advances in Cryptology-Eurocrypt '91, Apr. 1991, pp. 446-457.

Gifford, David K.; "Cryptographic Sealing for Information Secrecy and Authentication"; Stanford University and Xerox Palo Alto Research Center; Communications of the ACM; vol. 25, No. 4; Apr. 1982.

Hakola, et al, "A System for Automatic Value Exchange," Proceedings-Fall Joint Computer Conference, 1966, pp. 579-589.

Harty et al.; "Case Study; The VISA Transaction Processing System"; 1988.

Information Network Institute, Carnegie Mellon University; Internet Billing Server; Prototype Scope Document; Oct. 14, 1993.

International Organization for Standardization; "International Standard: Bank Card Originated Messages-Interchange Message Specifications-Content for Financial Transactions": ISO 8583; 1987.

Jansson, Lennart; "General Electronic Payment System"; 7th Proceedings of the International Conference on Computer Communication: pp. 832-837; 1985.

Kenny, "EDI Security: Risks and Solutions," COMPSEC 1992; The Ninth World Conference on Computer Security, Audit, and Control Nov. 1992, pp. 341-352.

Knapskog, Privacy Protected Payments- Realization of a Protocol That Guarantees Payor Anonymity, Advances in Cryptology-Eurocrypt '88, May 1988, pp. 107-122.

Krajewski, M. et al.; "Applicability of Smart Cards to Network User Authentication"; Computing Systems; vol. 7, No. 1; 1994.

Krajewski, M.; "Concepts for a Smart Card Kerberos"; 15th National Computer Security Conference; Oct. 1992.

Krajewski, M.; "Smart Card Augmentation of Kerberos"; Privacy and Security Research Group Workshop on Network and Distributed System Security; Feb. 1993.

Lal et al., "Endorsements, Licensing, and Insurance for Distributed System Services"; Information Sciences Institute Univ. of Southern CA., Assoc. for Computing Machinery 1994.

Medvinsky et al.; "Electronic Currency for the Internet"; Electronic Markets; pp. 30-31, Sep. 1993.

Medvinsky et al.; "NetCash; A Design for Practical Electronic Currency on the Internet"; Proc. 1st ACM Conf. on Comp. and Comm. Security; Nov., 1993.

Messmer, "NIST Stumbles on Proposal for Public Key Encryption," Network World, Jul. 27, 1992, p. 1.

Needham, Roger M., "Adding Capability Access to Conventional File Servers"; Xerox Palo Alot Research Center; Palo Alot, California; Jan. 1979.

Okamoto et al.; "Universal Electronic Cash"; pp. 324-337; 1991.

P. Remeery et al., "Le Paiement electronique", pp. 15-23, 1988 L'Echo des RECHERCHES, No. 134.

Perry, "Electronic Banking Goes to Market," IEEE Spectrum, Feb. 1988, pp. 46-49.

Pfitzmann et al.; "How to Break and Repair a 'Provably Secure' Untracable Payment System"; pp. 338-350; 1991.

Ph. van Heurck, "TRASEC: Belgian Security System for Electronic Funds Transfers," Computers & Security, 1987, pp. 261-268.

Pongratz, et al, "IC Cards in Videotex Systems," Smart Card 2000, 1989, pp. 179-186.

Hirschfeld, Rafael "Making Electronic Refunds Safer"; Sections 1, 2, 4 and 6, 1992.

Rivest, R.L. et al., "A Method for Obtaining Digital Signatures and Public-Key Cryptosystems," Laboratory for Computer Science, Massachusetts Institute of Technology, Cambridge, Massachusetts, date Sep. 1, 1977.

Schamuller-Bichl, I.; "IC-Cards in High-Security Applications"; Selected Papers from the Smart Card 2000 Conference; Springer Verlag; pp. 177-199; 1991.

Shain, "Security in Electronic Funds Transfer System," Computers & Security, 1989, pp. 123-137.

Sirbu, Marvin A.; "Internet Billing Service Design and Prototype Implementation"; An Internet Billing Server; pp. 1-19; 1993.

Staskauskas, "The Formal Specification and Design of a Distributed Electronic Funds Transfer System," IEEE Transactions on Computers, Dec. 1998, pp. 1515-1528.

Stol, Privacy Protected Payments-A Possible Structure for a Real Implementaition and Some Resource Considerations, Feb. 1998.

Strazewski, "Computerized Service Sets Shoppers Hacking," Advertising Age, Feb. 22, 1988, p. 62.

Takei, "Videotex Information System and Credit System Connecting with MARS-301 of JNR," Japanese Railway Engineering, No. 94, Sep. 1985, pp. 9-11.

Tanaka, et al, "Untraceable Electronic Funds Transfer System," Electronics and Communications in Japan, 1989, pp. 47-57.

Tenenbaum, Jay M. and Schiffman, Allan M.; "Development of Network Infrastructure and Services for Rapid Acquisition"; adapted from a white paper submitted to DARPA by MCC in collaboration with EIT and ISI, Jan. 1992 pp. 1-19.

Tunstall, "Electronic Currency," Smart Card 2000: The future of IC Cards, Oct. 1987, pp. 47-48.

Vittal, J. "Active Message Processing: Messages as Messengers"; pp. 175-195; 1981.

Waidner, et al, "Loss-Tolerance for Electronic Wallets," Fault-Tolerant Computing: 20th International Symposium, Jun. 1990, pp. 140-147.

Weber, "Controls in Electronic Funds Transfer System," Computers & Security, 1989, pp. 209-221.

Williams, "Debit Program Cuts Fraud; CompuServe Plan a Success," Pensions & Investment Age, Feb. 4, 1985, pp. 21-32.

Viescas, "Official Guide to the Prodigy Service" 1991.

"Announcing: Internet Shopkeeper" (Aug. 2, 1994) posting on comp.infosystems.www and misc.forsale.

Net Market ("Numerous News Media Stories" (Apr. 1994)) NY Times, front page of bus.

"Welcome First Time Visitors", dated Jun. 29, 1998, pp. 1-4.

"What's New," http://archive.ncsa.uluc.edu/SDG/Software/Mosaic/Docs/old-whats-new/whats-new-0294.html, 1994.

Archive of WWWorder mailing list (Jun. 18, 1994-Jun. 13, 1994).

Ariel Poler I/PRO 2nd WWW Conference Chicago IL (Oct. 1994) (Presentation).

Aronson, Dan, et al., Electronic Mail to multiple recipients of the www-talk list (www-talk@info.cern.ch) on "Access and session control" dated Sep. 15, 1994.

Batelaan; Butler; Chan; Chen; Evenchick; Hughes; Jen; Jeng; Millett; Riccio; Skoudis; Starace; Stoddard; "An Internet Billing Server Prototype Design"; Carnegie Mellon University; 1992.

Bemers-Lee, T. "draft-ietf-iiir-http-00.txt" (Nov. 5, 1993).

Berners-Lee, T., et al. RFC 1945: Hypertext Transfer Protocol-HTTP/1.0, dated May 1996, pp. 1-48.

Berners-Lee, T., et al., http://www.ieft.org/rfc/rfc1738.txt?numbers=1738, dated Dec. 1994, pp. 1-24.

Berners-Lee, T., RFC 1630: Universal Resource Identifiers in WWW: A Unifying Syntax for the Expression of Names and Addresses of Objects on the Network as used in the World-Wide Web, dated Jun. 1994, pp. 1-23.

Bieber, Michael, "Issues in Modeling a 'Dynamic' Hypertext Interface for Non-Hypertext Systems", Dec. 1991, pp. 203-217.

Biznet Technologies, Versatile Virtual Vending, published at http://www.bnt.com (Sep. 12, 1994).

Buhle, Jr., E. Loren, "Wide Area Info Services," Digital Systems J., Sep.-Oct., 1994, p. 13.

Business Wire, Jun. 26, 1995, "CommerceNet Urges Government to Ease Export Restrictions on Encryption Products; Consortium's New White Paper Articulates Position on the Export of Cryptography Based Products".

Corner, D., et al., "The Tilde File Naming Scheme," pp. 509-514, 6th International Conference on Distributed Computing Systems, IEEE Comp. Society, Cambridge NH May 1986.

Comer, D.E., et al., "A Model of Name resolution in Distributed Systems," pp. 520-530, 6th International Conference on Distributed Computing Systems IEEE Comp Society Cambridge NH May 1986.

Crocker, Glenn, "web2mush: Serving Interactive Resources to the Web," Electronic Proc. of the 2nd World Wide Web Conf. '94: Mosaic and the Web!, Developers Day, (Oct. 20, 1994).

Derler, Christian, "The World-Wide Web Gateway to Hyper-G: Using a Connectionless Protocol to Access Session-Oriented Services", Institut für Informationsverarbeitung and Computergestützte neue Medien, Graz, Austria, dated Mar. 1995.

Dukach, Seymon; Prototype Implementation of the SNPP Protocol; allspic.lcs.mit.edu; 1992.

English, Joe, Electronic Mail to multiple recipients of the www-talk list (www-talk@info.cern.ch) on "Re: Identifying Mosaic session" dated Dec. 20, 1994.

Ferrarini, E., "Flight of Fancy: Goodbye Travel Agent", Business Computer Systems, vol. 2, No. 11, pp. 39-40, Nov. 1993.

Fielding, R., et al. RFC 2068: Hypertext Transfer Protocol-HTTP/ 1.1, Jan. 1997, pp. 1-127.

Fielding, R., et al. RFC 2616: Hypertext Transfer Protocol-HTTP1/ 1, Jun. 1999, pp. 1-140.

Fielding, R., RFC 1808: Relative Uniform Resource Locators, Jun. 1995, pp. 1-13.

Fielding, Roy, et al., "Principled Design of the Modem Web Architecture" ACM Transactions on Internet Technology 2, 2 pp. 115-150 (May 2002).

Fielding, Roy, software distribution archive for the HTTP log file analysis program, wwwstat v1.01, dated Apr. 24, 1994, published at http://www.ics.uci.edu/WebSoft/wwwstat/.

Foster, David & Stuart Finn, "Insurers Can Benefit From E-Mail Networks", National Underwriter Property & Casualty-Risk & Benefits Management, No. 9, p. 46(2), Mar. 4, 1991.

Gifford, Stewart, Payne, Treese, "Payment Switches for Open Networks," presented at 40th IEEE, IEEEE, '95, Mar. 5-9, 1995, San Francisco, CA.

Hall, Devra, et al., "Build a Web Site: The Programmer's Guide to Creating, Building, and Maintaining a Web Presence", published Apr. 1995. ISBN 0-7615-0064-2.

Hughes, Kevin, source code file for the HTTP log file analysis program, getstats v1.0, dated Feb. 1, 1994, published at http://eit.com/software/getstats/getstats.html—Version 1, 64 pages.

Hughes, Kevin, source code file for the HTTP log file analysis program, getstats v1.0, dated Feb. 1, 1994, published at http://eit.com/software/getstats/getstats.html-Version 2, 64 pages.

It will happen, article excerpt from infoHighway, vol. 2-1, Jan. 1995.

Leggett, John et al., "Hyperform: Using Extensibility to Develop Dynamic, Open and Distributed Hypertext Systems" (1992).

Maren, Michael, "The Age of E-Mail," Home Office Computing, vol. 11, No. 12, p. 63(5), Dec. 1993.

McCartney, Todd, Message posted to Usenet public discussion group, rec.arts.disney, dated Nov. 21, 1994.

NCSA HTTPd release notes at http://hoohoo.ncsa.uius.edu/docs/Upgrade.html (last updated Aug. 1, 1995).

Nielson, Jacob, Hypertext & Hypermedia (1990).

O'Mahony, Donald, Michael Peirce, & Hitesh Tewari, Electronic Payment Systems, Artech House, Inc., pp. 145-155, Jan. 1997.

Pitkow, et al., "Results from the First World Wide Web Use Survey", presented at the First International Conference on the World Wide Web, Geneva, Switzerland, May 25-27, 1994, published at http://www94.web.cern.ch/www94/PrelimProcs.html on Jun. 2, 1994, and reprinted in the Journal of Computer Networks and ISDN Systems, vol. 27, No. 2, Nov. 1994, Elsevier Science B.V.

Smithson, Brain, and Singer, Barbara, An Information Clearinghouse Server for Industry Consortia, 2nd Int'l Conf. On the World Wide Web, Chicago, Ill, Oct. 1994.

Stallings, William, Data & Computer Communications, MacMillan Publishing, 1985, pp. 245-252.

The Major BBS: Collection of Information and Advertisements concerning The Major BBS (Fall 1993).

The NetMarket Company, NetMarket PGP Help file, from http://www.netmarket.com, dated Dec. 10, 1994.

Trewitt, Glenn, "Using Tcl to Process HTML Forms", Digital Equipment Corporation, Network Systems Laboratory TN-14, dated Mar. 1994.

Trip et al., "Cookies" (client-side pesistent information) and their use, Netscape Technical Note 20019, Netscape Communications Corp., Oct. 1995.

www talk mailing list: Troth message Sep. 15, 1994.

wwwStat Readme file at http://ftp.ics.uci.edu/pub/websoft/ww-wstat/readme, dated May 18, 2005.

Ohmori et al., "An On-line Shopping System Protecting User's Privacy", Information Communication Laboratory of Matsushita Electric Industrial Co., Ltd., pp. 25-32. Note: 12 Pages of Translation Attached, Oct. 1994.

*Soverain Software LLC* v. *Amazon.Com, Inc. and The Gap, Inc.*, Form of Stipulated Request for Final Dismissals of the Actions, filed Aug. 30, 2005.

*Soverain Software LLC* v. *Amazon.Com, Inc. and The Gap, Inc.*, Order of Dismissal with Prejudice filed Aug. 31, 2005.

Bina et al., "Secure Access to Data Over the Internet", Natl. Center for Supercomputing Appls., Unv. Of Illinois, Champaign, Illinois, pp. 99-102, Sep. 1994.

Farber, David, "Interesting-People Message—RSA/NCSA/EIT Announcement on Secure Mosiac" Palo Alto, California, Apr. 12, 1994, 4 pages.

Kent, Stephen T., "Internet Privacy Enhanced Mail", 8070 Communications of the ACM 36, New York, Aug. 1993, pp. 48-60.

Kohn, Dan, "Prior Art on Open Market Patents", e-mail message dated Mar. 9, 1998, 1 page.

Lewis, Peter H., "Attention Shoppers: Internet is Open", 2 pages, Aug. 1994, New York Times.

Medvinsky et al., NetCash: A Design for Practical Electronic Currency on the Internet, Information Sciences Institute, University of Southern California, 1993, pp. 102-106, Nov. 1993.

Schaefer et al., "Networked Information Discovery and Retrieval Tools: Security Capabilities and Needs", The MITRE Corporation, 1994, pp. 145-153, Dec. 1994.

European Search Report dated Jun. 19, 2006.

Kahan, Jose "Un nouveau modele d'authorisation pour les systemes de consultation d'information multimedia repartie", pp. 45-57. Dec. 15, 1994.

Kahan, Jose, "A New Authorization Model for Distributed Multimedia Information Consultation Systems," English translation, pp. 1-21. Dec. 15, 1994.

* cited by examiner

| Document View |
|---|
| *File*    *Options*    *Navigate*    *Annotate*    *Documents*           *Help* |
| Title:   How to join |
| URL:   http://auth.com/service/nph-createacct.cgi |

1. First name
2. Last name
3. Choose a screen name (no more than 15 characters)
4. Choose a password (no more than 15 characters)
   Password:
   Re-enter password:
5. E-mail address
6. Your birthdate (MM/DD/YY
7. U.S. zip code, or country code
   Zip/postal code:

ISO country code
   US

FIG. 5

INTERNET SERVER ACCESS CONTROL AND MONITORING SYSTEMS

RELATED APPLICATION

This application is a Continuation of U.S. Ser. No. 08/474,096, filed Jun. 7, 1995, now U.S. Pat. No. 5,708,780 the entire teachings of which are incorporated herein by reference.

BACKGROUND TO THE INVENTION

The Internet, which started in the late 1960s, is a vast computer network consisting of many smaller networks that span the entire globe. The Internet has grown exponentially, and millions of users ranging from individuals to corporations now use permanent and dial-up connections to use the Internet on a daily basis worldwide. The computers or networks of computers connected within the Internet, known as "hosts", allow public access to databases featuring information in nearly every field of expertise and are supported by entities ranging from universities and government to many commercial organizations.

The information on the Internet is made available to the public through "servers". A server is a system running on an Internet host for making available files or documents contained within that host. Such files are typically stored on magnetic storage devices, such as tape drives or fixed disks, local to the host. An Internet server may distribute information to any computer that requests the files on a host. The computer making such a request is known as the "client", which may be an Internet-connected workstation, bulletin board system or home personal computer (PC).

TCP/IP (Transmission Control Protocol/Internet Protocol) is one networking protocol that permits full use of the Internet. All computers on a TCP/IP network need unique ID codes. Therefore, each computer or host on the Internet is identified by a unique number code, known as the IP (Internet Protocol) number or address, and corresponding network and computer names. In the past, an Internet user gained access to its resources only by identifying the host computer and a path through directories within the host's storage to locate a requested file. Although various navigating tools have helped users to search resources on the Internet without knowing specific host addresses, these tools still require a substantial technical knowledge of the Internet.

The World-Wide Web (Web) is a method of accessing information on the Internet which allows a user to navigate the Internet resources intuitively, without IP addresses or other technical knowledge. The Web dispenses with command-line utilities which typically require a user to transmit sets of commands to communicate with an Internet server. Instead, the Web is made up of hundreds of thousands of interconnected "pages", or documents, which can be displayed on a computer monitor. The Web pages are provided by hosts running special servers. Software which runs these Web servers is relatively simple and is available on a wide range of computer platforms including PC's. Equally available is a form of client software, known as a Web "browser", which is used to display Web pages as well as traditional non-Web files on the client system. Today, the Internet hosts which provide Web servers are increasing at a rate of more than 300 per month, en route to becoming the preferred method of Internet communication.

Created in 1991, the Web is based on the concept of "hypertext" and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes which indicate how the page should be displayed. The Web client, a browser, reads these codes in order to display the page. The hypertext conventions and related functions of the world wide web are described in the appendices of U.S. patent application Ser. No. 08/328,133, filed on Oct. 24, 1994, by Payne et al. which is incorporated herein by reference.

Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator). URLs enable a Web browser to go directly to any file held on any Web server. A user may also specify a known URL by writing it directly into the command line on a Web page to jump to another Web page.

The URL naming system consists of three parts: the transfer format, the host name of the machine that holds the file, and the path to the file. An example of a URL may be:

http://www.college.univ.edu/Adir/Bdir/Cdir/page.html, where "http" represents the transfer protocol; a colon and two forward slashes (://) are used to separate the transfer format from the host name; "www.college.univ.edu" is the host name in which "www" denotes that the file being requested is a Web page; "/Adir/Bdir/Cdir" is a set of directory names in a tree structure, or a path, on the host machine; and "page.html" is the file name with an indication that the file is written in HTML.

The Internet maintains an open structure in which exchanges of information are made cost-free without restriction. The free access format inherent to the Internet, however, presents difficulties for those information providers requiring control over their Internet servers. Consider for example, a research organization that may want to make certain technical information available on its Internet server to a large group of colleagues around the globe, but the information must be kept confidential. Without means for identifying each client, the organization would not be able to provide information on the network on a confidential or preferential basis. In another situation, a company may want to provide highly specific service tips over its Internet server only to customers having service contracts or accounts.

Access control by an Internet server is difficult for at least two reasons. First, when a client sends a request for a file on a remote Internet server, that message is routed or relayed by a web of computers connected through the Internet until it reaches its destination host. The client does not necessarily know how its message reaches the server. At the same time, the server makes responses without ever knowing exactly who the client is or what its IP address is. While the server may be programmed to trace its clients, the task of tracing is often difficult, if not impossible. Secondly, to prevent unwanted intrusion into private local area networks (LAN), system administrators implement various data-flow control mechanisms, such as the Internet "firewalls", within their networks. An Internet firewall allows a user to reach the Internet anonymously while preventing intruders of the outside world from accessing the user's LAN.

SUMMARY OF THE INVENTION

The present invention relates to methods of processing service requests from a client to a server through a network. In particular the present invention is applicable to processing client requests in an HTTP (Hypertext Transfer Protocol) environment, such as the World-Wide Web (Web). One aspect of the invention involves forwarding a service request from the client to the server and appending a session identification (SID) to the request and to subsequent service requests from the client to the server within a session of requests. In a preferred embodiment, the present method involves returning the SID from the server to the client upon an initial service request made by the client. A valid SID may include an authorization identifier to allow a user to access controlled files.

In a preferred embodiment, a client request is made with a Uniform Resource Locator (URL) from a Web browser. Where a client request is directed to a controlled file without an SID, the Internet server subjects the client to an authorization routine prior to issuing the SID, the SID being protected from forgery. A content server initiates the authorization routine by redirecting the client's request to an authentication server which may be at a different host. Upon receiving a redirected request, the authentication server returns a response to interrogate the client and then issues an SID to a qualified client. For a new client, the authentication server may open a new account and issue an SID thereafter. A valid SID typically comprises a user identifier, an accessible domain, a key identifier, an expiration time such as date, the IP address of the user computer, and an unforgeable digital signature such as a cryptographic hash of all of the other items in the SID encrypted with a secret key. The authentication server then forwards a new request consisting of the original URL appended by the SID to the client in a REDIRECT. The modified request formed by a new URL is automatically forwarded by the client browser to the content server.

When the content server receives a URL request accompanied by an SID, it logs the URL with the SID and the user IP address in a transaction log and proceeds to validate the SID. When the SID is so validated, the content server sends the requested document for display by the client's Web browser.

In the preferred embodiment, a valid SID allows the client to access all controlled files within a protection domain without requiring further authorization. A protection domain is defined by the service provider and is a collection of controlled files of common protection within one or more servers.

When a client accesses a controlled Web page with a valid SID, the user viewing the page may want to traverse a link to view another Web page. There are several possibilities. The user may traverse a link to another page in the same path. This is called a "relative link". A relative link may be made either within the same domain or to a different domain. The browser on the client computer executes a relative link by rewriting the current URL to replace the old controlled page name with a new one. The new URL retains all portions of the old, including the SID, except for the new page name. If the relative link points to a page in the same protection domain, the SID remains valid, and the request is honored. However, if the relative link points to a controlled page in a different protection domain, the SID is no longer valid, and the client is automatically redirected to forward the rewritten URL to the authentication server to update the SID. The updated or new SID provides access to the new domain if the user is qualified.

The user may also elect to traverse a link to a document in a different path. This is called an "absolute link". In generating a new absolute link, the SID is overwritten by the browser. In the preferred embodiment, the content server, in each serving of a controlled Web page within the domain, filters the page to include the current SID in each absolute URL on the page. Hence, when the user elects to traverse an absolute link, the browser is facilitated with an authenticated URL which is directed with its SID to a page in a different path. In another embodiment, the content server may forego the filtering procedure as above-described and redirect an absolute URL to the authentication server for an update.

An absolute link may also be directed to a controlled file in a different domain. Again, such a request is redirected to the authentication server for processing of a new SID. An absolute link directed to an uncontrolled file is accorded an immediate access.

In another embodiment, a server access control may be maintained by programming the client browser to store an SID or a similar tag for use in each URL call to that particular server. This embodiment, however, requires a special browser which can handle such communications and was generally not suitable for early browser formats common to the Web. However, it may now be implemented in cookie compatible browsers.

Another aspect of the invention is to monitor the frequency and duration of access to various pages both controlled and uncontrolled. A transaction log within a content server keeps a history of each client access to a page including the link sequence through which the page was accessed. Additionally, the content server may count the client requests exclusive of repeated requests from a common client. Such records provide important marketing feedback including user demand, access pattern, and relationships between customer demographics and accessed pages and access patterns.

The above and other features of the invention including various novel details of construction and combinations of parts will now be more particularly described with reference to the accompanying drawings and pointed out in the claims. It will be understood that the particular devices and methods embodying the invention are shown by way of illustration only and not as limitations of the invention. The principles and features of this invention may be employed in varied and numerous embodiments without departing from the scope of the invention.

BRIEF DESCRIPTION OF THE DRAWINGS

FIG. 5 is an example of an authorization form page.

DETAILED DESCRIPTION OF THE INVENTION

Figure 1:
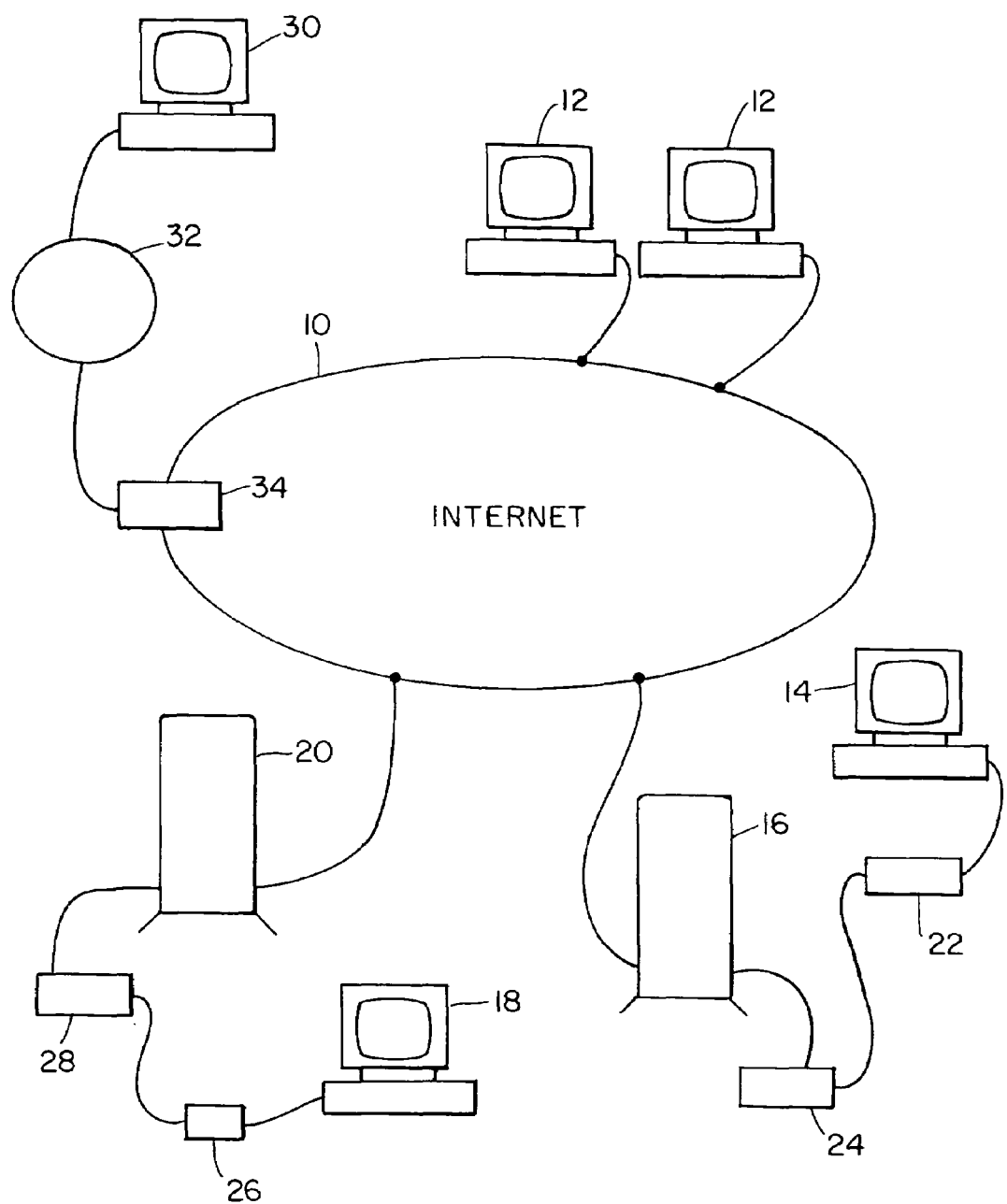
FIG. 1 is a diagram illustrating the Internet operation.

Referring now to the drawings, FIG. 1 is a graphical illustration of the Internet. The Internet 10 is a network of millions of interconnected computers 12 including systems owned by Internet providers 16 and information systems (BBS) 20 such as Compuserve or America Online. Individual or corporate users may establish connections to the Internet in several ways. A user on a home PC 14 may purchase an account through the Internet provider 16. Using a modem 22, the PC user can dial up the Internet provider to connect to a high speed modem 24 which, in turn, provides a full service connection to the Internet. A user 18 may also make a somewhat limited connection to the Internet through a BBS 20 that provides an Internet gateway connection to its customers.

Figure 2A:
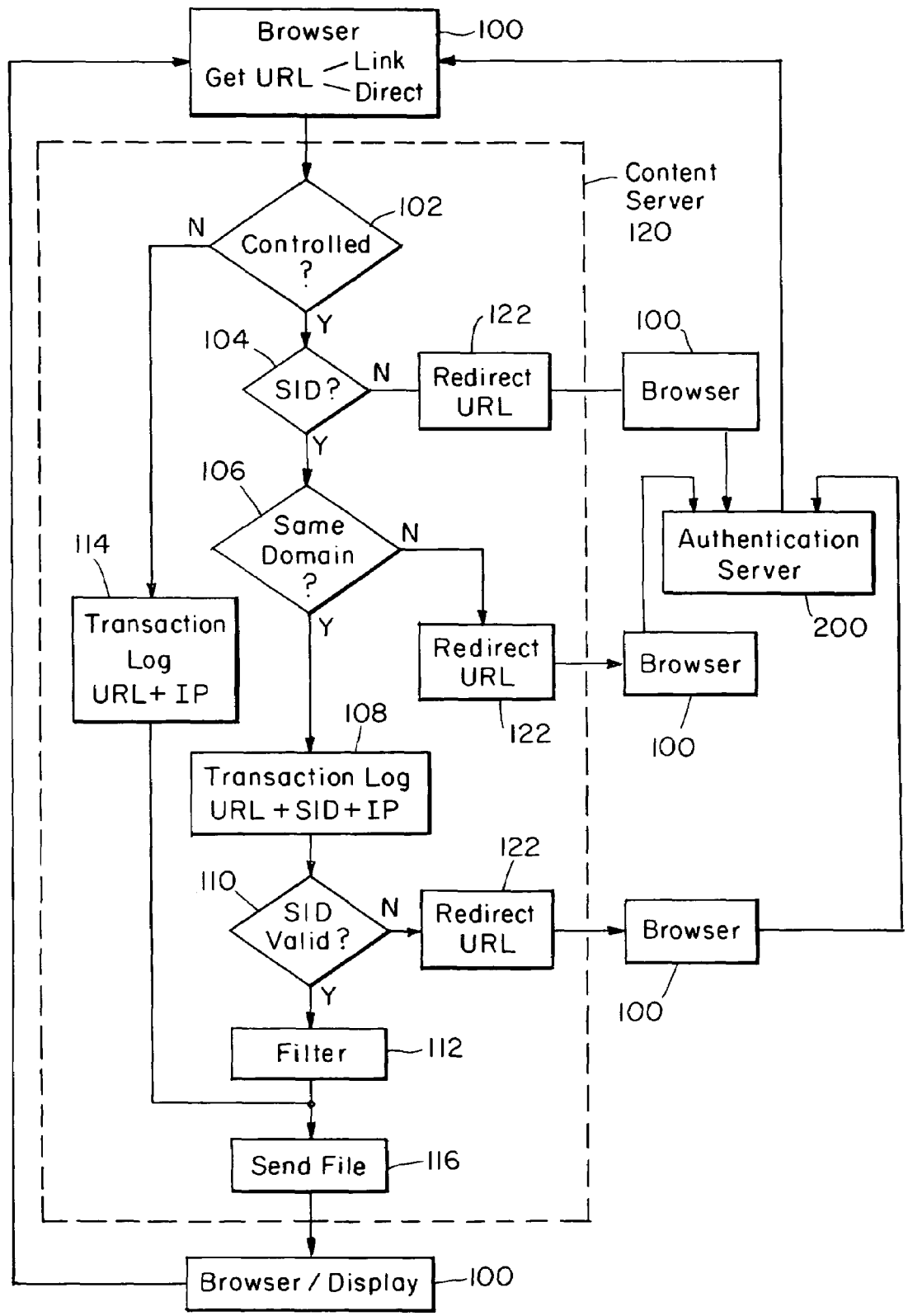
FIG. 2A is a flowchart describing the preferred method of Internet server access control and monitoring.
Figure 4:
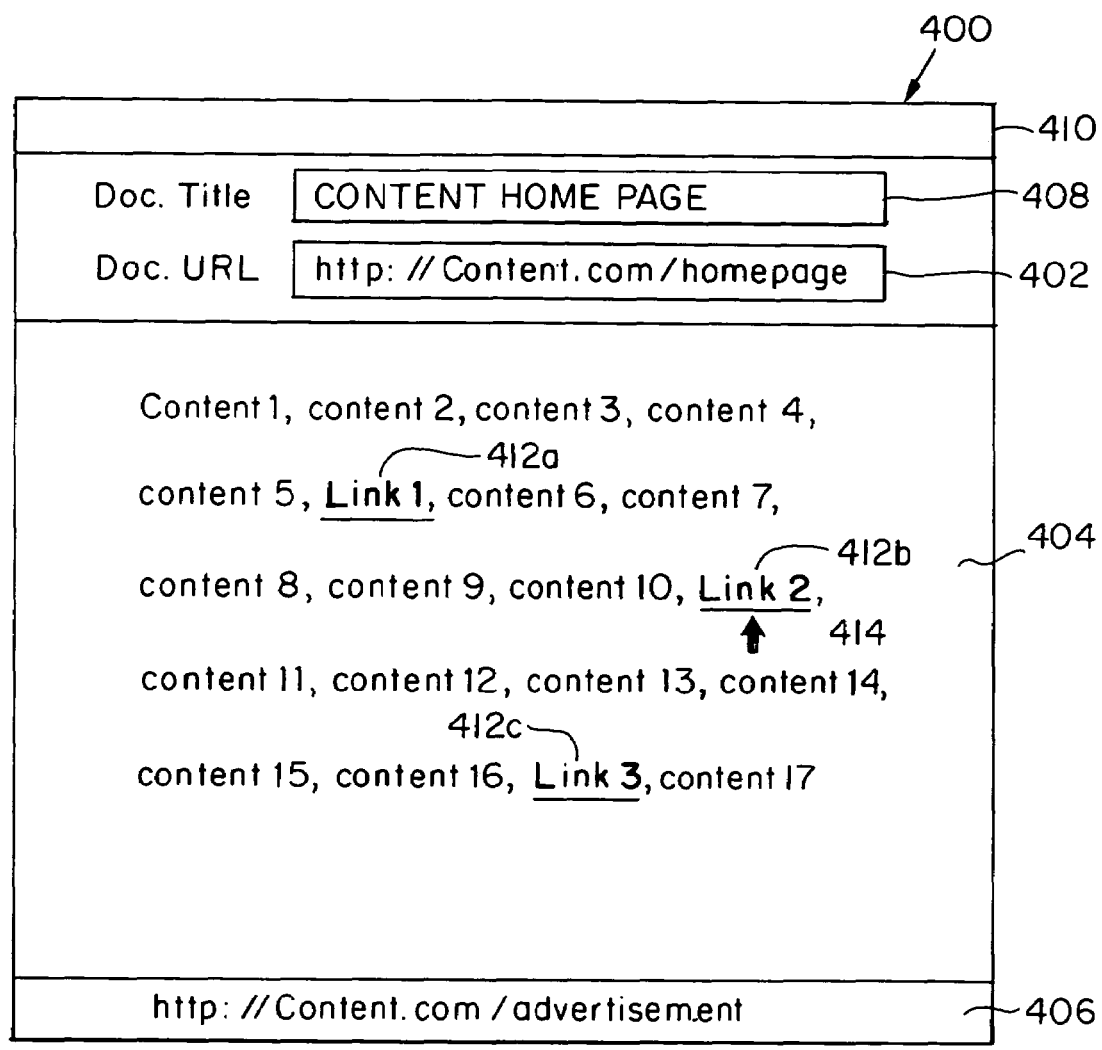
FIG. 4 is an example of a World Wide Web page.

FIG. 2A is a flowchart detailing the preferred process of the present invention and FIG. 4 illustrates a sample Web page displayed at a client by a browser. The page includes text 404 which includes underlined link text 412. The title bar 408 and URL bar 402 display the title and URL of the current web page, respectively. As shown in FIG. 4, the title of the page is "Content Home Page" and the corresponding URL is "http://content.com/homepage". When a cursor 414 is positioned over link text 412b, the page which would be retrieved by clicking a mouse is typically identified in a status bar 406 which shows the URL for that link. In this example the status bar 406 shows that the URL for the pointed link 412b is directed to a page called "advertisement" in a commercial content server called "content". By clicking on the link text, the user causes the browser to generate a URL GET request at 100 in FIG. 2A. The browser forwards the request to a content server 120, which processes the request by first determining whether the requested page is a controlled document 102. If the request is directed to an uncontrolled page, as in "advertisement" page in this example, the content server records the URL and the IP address, to the extent it is available, in the transaction log 114. The content server then sends the requested page to the browser 116 for display on the user computer 117.

If the request is directed to a controlled page, the content server determines whether the URL contains an SID 102. For example, a URL may be directed to a controlled page name "report", such as "http://content.com/report", that requires an SID. If no SID is present, as in this example, the content server sends a "REDIRECT" response 122 to the browser 100 to redirect the user's initial request to an authentication server 200 to obtain a valid SID. The details of the authentication process are described in FIG. 2B and will be discussed later, but the result of the process is an SID provided from the authentication server to the client. In the above example, a modified URL appended with an SID may be: "http://content.com/[SID]/report". The preferred SID is a sixteen character ASCII string that encodes 96 bits of SID data, 6 bits per character. It contains a 32-bit digital signature, a 16-bit expiration date with a granularity of one hour, a 2-bit key identifier used for key management, an 8-bit domain comprising a set of information files to which the current SID authorizes access, and a 22-bit user identifier. The remaining bits are reserved for expansion. The digital signature is a cryptographic hash of the remaining items in the SID and the authorized IP address which are encrypted with a secret key which is shared by the authentication and content servers.

If the initial GET URL contains a SID, the content server determines whether the request is directed to a page within the current domain 106. If the request having a SID is directed to a controlled page of a different domain, the SID is no longer valid and, again, the user is redirected to the authentication server 122.

If the request is for a controlled page within the current domain, the content server proceeds to log the request URL, tagged with SID, and the user IP address in the transaction log 108. The content server then validates the SID 110. Such validation includes the following list of checks: (1) the SID's digital signature is compared against the digital signature computed from the remaining items in the SID and the user IP address using the secret key shared by the authentication and content servers; (2) the domain field of the SID is checked to verify that it is within the domain authorized; and (3) the EXP field of the SID is checked to verify that it is later than the current time.

If the validation passes, the content server searches the page to be forwarded for any absolute URL links contained therein 112, that is, any links directed to controlled documents in different content servers. The content server augments each absolute URL with the current SID to facilitate authenticated accesses across multiple content servers. The requested page as processed is then transmitted to the client browser for display 117. The user viewing the requested Web page may elect to traverse any link on that page to trigger the entire sequence again 100.

Figure 2B:
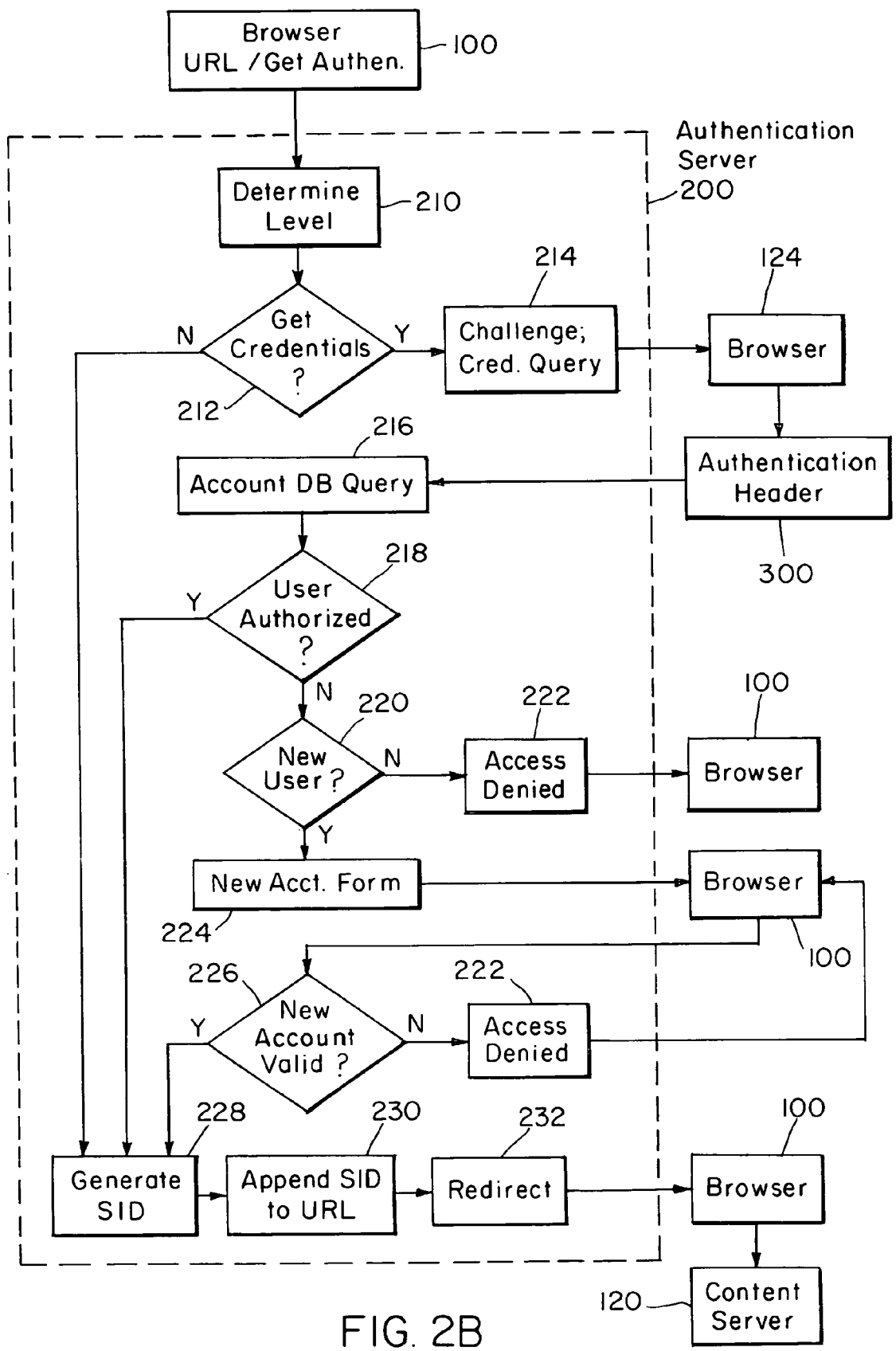
FIG. 2B is a related flowchart describing the details of the authentication process.

FIG. 2B describes the details of the authentication process. The content server may redirect the client to an authentication server. The REDIRECT URL might be: "http://auth.com/authenticate?domain=[domain] &URL=http://content.com/report". That URL requests authentication and specifies the domain and the initial URL. In response to the REDIRECT, the client browser automatically sends a GET request with the provided URL.

Whenever the content server redirects the client to the authentication server 200, the authentication server initiates the authorization process by validating that it is for an approved content server and determining the level of authentication required for the access requested 210. Depending on this level, the server may challenge the user 212 for credentials. If the request is for a low level document, the authentication may issue an appropriate SID immediately 228 and forego the credential check procedures. If the document requires credentials, the authentication server sends a "CHALLENGE" response which causes the client browser to prompt the user for credentials 214. A preferred credential query typically consists of a request for user name and password. If the user is unable to provide a password, the access is denied. The browser forms an authorization header 300 from the information provided, and resends a GET request to the authentication server using the last URL along with an authorization header. For example, a URL of such a GET request may be: "http://auth.com/authenticate?domain=[domain]&URL=http://content.com/report and the authorization header may be: "AUTHORIZE: [authorization]".

Upon receiving the GET request, the authentication server queries an account database 216 to determine whether the user is authorized 218 to access the requested document. A preferred account database may contain a user profile which includes information for identifying purposes, such as client IP address and password, as well as user demographic information, such as user age, home address, hobby, or occupation, for later use by the content server. If the user is authorized, an SID is generated 228 as previously described. If the user is not cleared for authorization, the authentication server checks to see if the user qualifies for a new account

220. If the user is not qualified to open a new account, a page denying access 222 is transmitted to the client browser 100. If the user is qualified, the new user is sent a form page such as illustrated in FIG. 5 to initiate a real-time on-line registration 224. The form may, for example, require personal information and credit references from the user. The browser is able to transmit the data entered by the user in the blanks 502 as a "POST" message to the authentication server. A POST message causes form contents to be sent to the server in a data body other than as part of the URL. If the registration form filled out by the new user is valid 226, an appropriate SID is generated 228. If the registration is not valid, access is again denied 222.

An SID for an authorized user is appended ("tagged") 230 to the original URL directed to a controlled page on the content server. The authentication server then transmits a REDIRECT response 232 based on the tagged URL to the client browser 100. The modified URL, such as "http://content.com/[SID]/report" is automatically forwarded to the content server 120.

Figure 3:
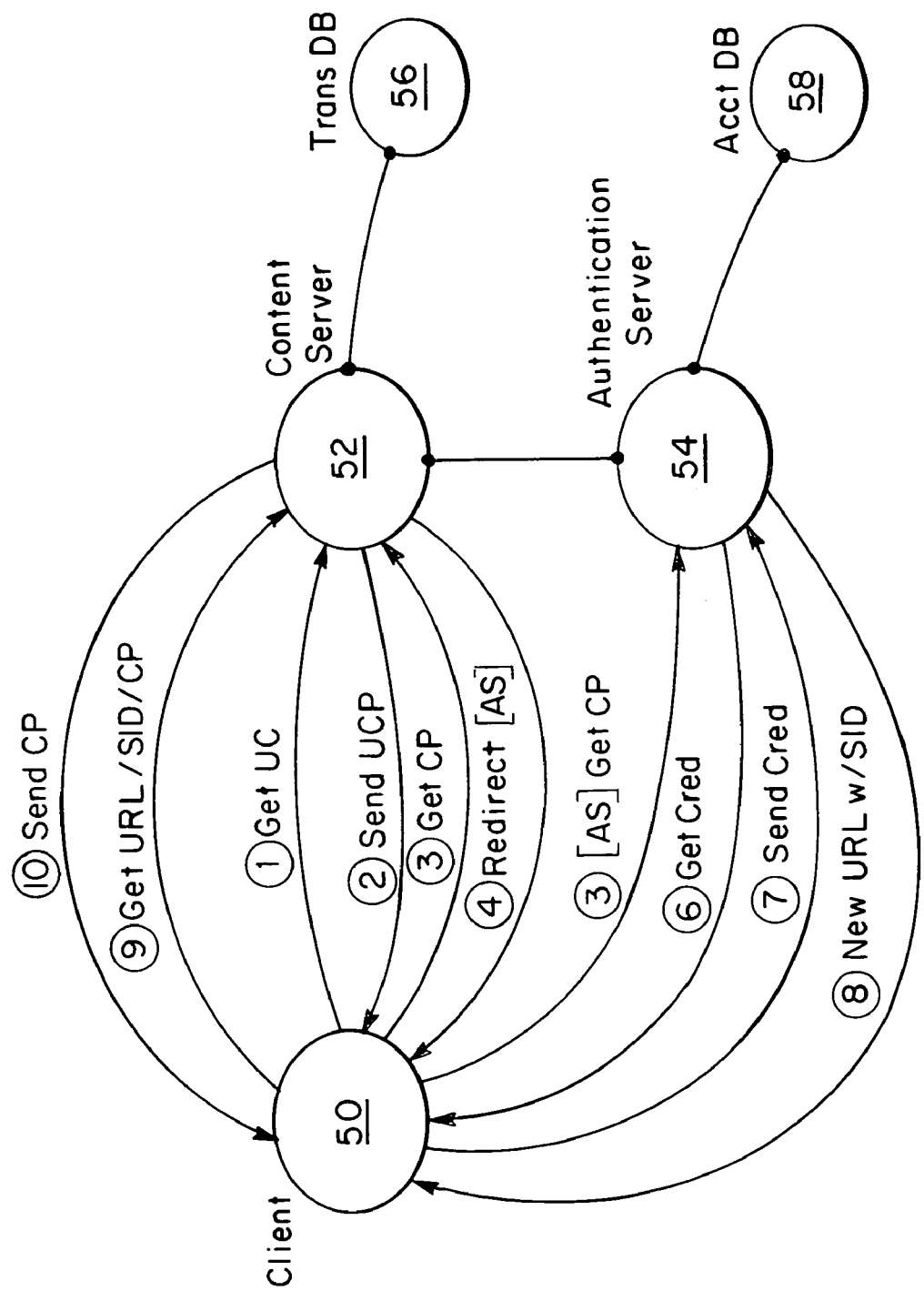
FIG. 3 illustrates an example of a client-server exchange session involving the access control and monitoring method of the present invention.

FIG. 3, illustrates a typical client-server exchange involving the access control and monitoring method of the present invention. In Step 1, the client 50 running a browser transmits a GET request through a network for an uncontrolled page (UCP). For example, the user may request an advertisement page by transmitting a URL "http://content.com/advertisement", where "content.com" is the server name and "advertisement" is the uncontrolled page name. In Step 2, the content server 52 processes the GET request and transmits the requested page, "advertisement". The content server also logs the GET request in the transaction database 56 by recording the URL, the client IP address, and the current time.

In Step 3, the user on the client machine may elect to traverse a link in the advertisement page directed to a controlled page (CP). For example, the advertisement page may contain a link to a controlled page called "report". Selecting this link causes the client browser 50 to forward a GET request through a URL which is associated with the report file "http://content.com/report". The content server 52 determines that the request is to a controlled page and that the URL does not contain an SID. In Step 4, the content server transmits a REDIRECT response to the client, and, in Step 5, the browser automatically sends the REDIRECT URL to the authentication server 54. The REDIRECT URL sent to the authentication server may contain the following string:

"http://auth.com/authenticate?domain=[domain] &URL=http://content.com/report"

The authentication server processes the REDIRECT and determines whether user credentials (CRED) are needed for authorization. In Step 6, the authentication server transmits a "CHALLENGE" response to the client. As previously described, typical credentials consist of user name and password. An authorization header based on the credential information is then forwarded by the client browser to the authentication server. For example, a GET URL having such an authorization header is: "http://autho.com/authenticate?domain=[domain]&URL=http://content.com/report and the authorization header may be: "AUTHORIZE: [authorization]". The authentication server processes the GET request by checking the Account Database 58. If a valid account exists for the user, an SID is issued which authorizes access to the controlled page "report" and all the other pages within the domain.

As previously described, the preferred SID comprises a compact ASCII string that encodes a user identifier, the current domain, a key identifier, an expiration time, the client IP address, and an unforgeable digital signature. In Step 8, the authentication server redirects the client to the tagged URL, "http://content.com/[SID]/report", to the client. In Step 9, the tagged URL is automatically forwarded by the browser as a GET request to the content server. The content server logs the GET request in the Transaction database 56 by recording the tagged URL, the client IP address, and the current time. In Step 10, the content server, upon validating the SID, transmits the requested controlled page "report" for display on the client browser.

According to one aspect of the present invention, the content server periodically evaluates the record contained in the transaction log 56 to determine the frequency and duration of accesses to the associated content server. The server counts requests to particular pages exclusive of repeated requests from a common client in order to determine the merits of the information on different pages for ratings purposes. By excluding repeated calls, the system avoids distortions by users attempting to "stuff the ballot box."

In one embodiment, the time intervals between repeated requests by a common client are measured to exclude those requests falling within a defined period of time.

Additionally, the server may, at any given time, track access history within a client-server session. Such a history profile informs the service provider about link traversal frequencies and link paths followed by users. This profile is produced by filtering transaction logs from one or more servers to select only transactions involving a particular user ID (UID). Two subsequent entries, A and B, corresponding to requests from a given user in these logs represent a link traversal from document A to document B made by the user in question. This information may be used to identify the most popular links to a specific page and to suggest where to insert new links to provide more direct access. In another embodiment, the access history is evaluated to determine traversed links leading to a purchase of a product made within commercial pages. This information may be used, for example, to charge for advertising based on the number of link traversals from an advertising page to a product page or based on the count of purchases resulting from a path including the advertisement. In this embodiment, the server can gauge the effectiveness of advertising by measuring the number of sales that resulted from a particular page, link, or path of links. The system can be configured to charge the merchant for an advertising page based on the number of sales that resulted from that page.

According to another aspect of the present invention, a secondary server, such as the authentication server 200 in FIG. 2B, may access a prearranged user profile from the account database 216 and include information based on such a profile in the user identifier field of the SID. In a preferred embodiment, the content server may use such an SID to customize user requested pages to include personalized content based on the user identifier field of the SID.

In another aspect of the invention, the user may gain access to domain of servers containing journals or publications through a subscription. In such a situation, the user may purchase the subscription in advance to gain access to on-line documents through the Internet. The user gains access to a subscribed document over the Internet through the authorization procedure as described above where an authorization indicator is preferably embedded in a session identifier. In another embodiment, rather than relying on a prepaid subscription, a user may be charged and billed each time he or she accesses a particular document through the Internet. In that case, authorization may not be required so long as the user is fully identified in order to be charged for the service. The user identification is most appropriately embedded in the session identifier described above.

Figure 6:
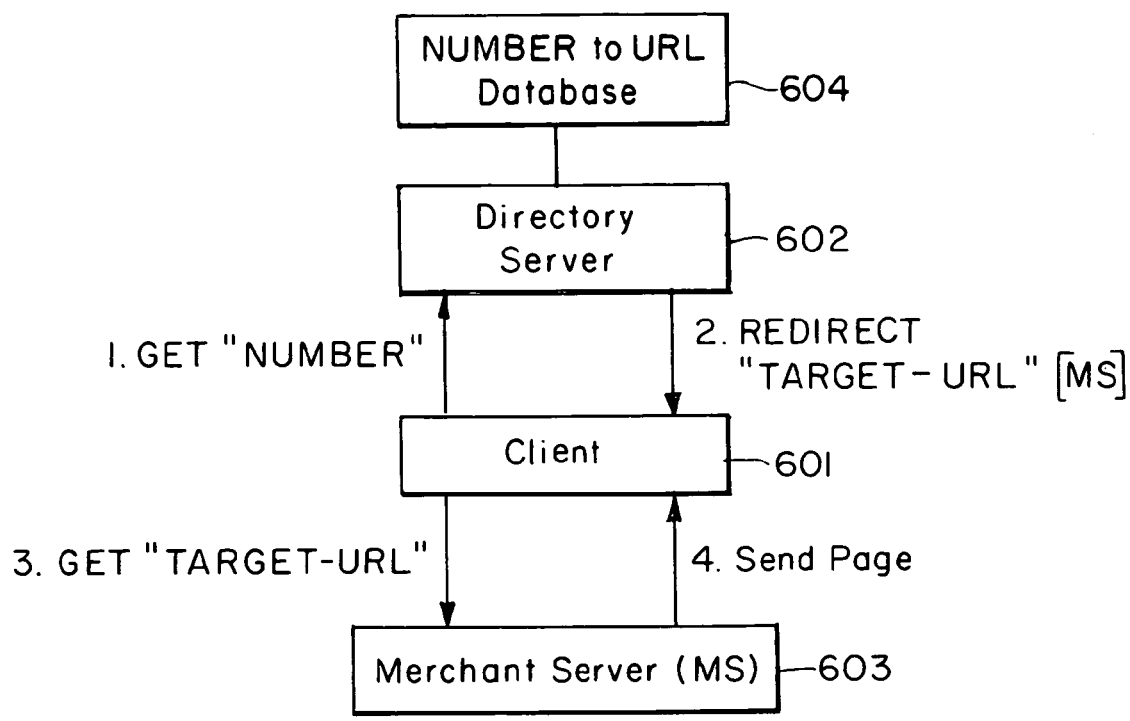
FIG. 6 is a diagram describing the details of the translation of telephone numbers to URLs.

In another aspect of the invention, facilities are provided to allow users to utilize conventional telephone numbers or other identifiers to access merchant services. These merchant services can optionally be protected using SIDs. In a preferred embodiment, as shown in FIG. 6, a Web browser client 601 provides a "dial" command to accept a telephone number from a user, as by clicking on a "dial" icon and inputting the telephone number through the keyboard. The browser then constructs a URL of the form "http://directory.net/NUMBER", where NUMBER is the telephone number or other identifier specified by the user. The browser then performs a GET of the document specified by this URL, and contacts directory server 602, sending the NUMBER requested in Message 1.

In another embodiment, implemented with a conventional browser, client 601 uses a form page provided by directory server 601 that prompts for a telephone number or other identifier in place of a "dial" command, and Message 1 is a POST message to a URL specified by this form page.

Once NUMBER is received by directory server 601, the directory server uses database 604 to translate the NUMBER to a target URL that describes the merchant server and document that implements the service corresponding to NUMBER. This translation can ignore the punctuation of the number, therefore embedded parenthesis or dashes are not significant.

In another embodiment an identifier other than a number may be provided. For example, a user may enter a company name or product name without exact spelling. In such a case a "soundex" or other phonetic mapping can be used to permit words that sound alike to map to the same target URL. Multiple identifiers can also be used, such as a telephone number in conjunction with a product name or extension.

In Message 2, Directory server 602 sends a REDIRECT to client 601, specifying the target URL for NUMBER as computed from database 604. The client browser 601 then automatically sends Message 3 to GET the contents of this URL. Merchant server 603 returns this information in Message 4. The server 602 might have returned a Web page to the client to provide an appropriate link to the required document. However, because server 602 makes a translation to a final URL and sends a REDIRECT rather than a page to client 601, the document of message 4 is obtained without any user action beyond the initial dial input.

The Target URL contained in Message 3 can be an ordinary URL to an uncontrolled page, or it can be a URL that describes a controlled page. If the Target URL describes a controlled page then authentication is performed as previously described. The Target URL can also describe a URL that includes an SID that provides a preauthorized means of accessing a controlled page.

Among benefits of the "dial" command and its implementation is an improved way of accessing the Internet that is compatible with conventional telephone numbers and other identifiers. Merchants do not need to alter their print or television advertising to provide an Internet specific form of contact information, and users do not need to learn about URLs.

In the approach a single merchant server can provide multiple services that correspond to different external "telephone numbers" or other identifiers. For example, if users dial the "flight arrival" number they could be directed to the URL for the arrival page, while, if they dial the "reservations" number, they would be directed to the URL for the reservations page. A "priority gold" number could be directed to a controlled page URL that would first authenticate the user as belonging to the gold users group, and then would provide access to the "priority gold" page. An unpublished "ambassador" number could be directed to a tagged URL that permits access to the "priority gold" page without user authentication.

This invention has particular application to network sales systems such as presented in U.S. patent application Ser. No. 08/328,133, filed Oct. 24, 1994, by Payne et al. which is incorporated herein by reference.

EQUIVALENTS

Those skilled in the art will know, or be able to ascertain using no more than routine experimentation, many equivalents to the specific embodiments or the invention described herein. These and all other equivalents are intended to be encompassed by the following claims.

What is claimed is:

1. A method of processing service requests from a client to a server system through a network, said method comprising the steps of forwarding a service request from the client to the server system, wherein communications between the client and server system are according to hypertext transfer protocol;

returning a session identifier from the server system to the client, the client storing the session identifier for use in subsequent distinct requests to the server system; and appending the stored session identifier to each of the subsequent distinct requests from the client to the server system.

2. A method as claimed in claim 1 wherein the session identifier includes a user identifier.

3. A method as claimed in claim 1 wherein the session identifier includes an expiration time for the session.

4. A method as claimed in claim 1 wherein the server system records information from the session identifier in a transaction log in the server system.

5. A method as claimed in claim 4 wherein the server system tracks the access history of sequences of service requests within a session of requests.

6. A method as claimed in claim 5 wherein the server system tracks the access history to determine service requests leading to a purchase made within the session of requests.

7. A method as claimed in claim 4 wherein the server system counts requests to particular services exclusive of repeated requests from a common client.

8. A method as claimed in claim 4 wherein the server system maintains a data base relating customer information to access patterns.

9. A method as claimed in claim 8 wherein the information includes customer demographics.

10. A method as claimed in claim 1 wherein the server system assigns the session identifier to an initial service request to the server system.

11. A method as claimed in claim 1 wherein the server system subjects the client to an authorization routine prior to issuing the session identifier and the session identifier is protected from forgery.

12. A method as claimed in claim 1 wherein the server system comprises plural servers including an authentication server which provides session identifiers for service requests to multiple servers.

13. A method as claimed in claim 12 wherein:
a client directs a service request to a first server which is to provide the requested service;
the first server checks the service request for a session identifier and only services a service request having a valid session identifier, and where the service request has no valid identifier:
the first server returns a response to the client, the response redirecting the service request from the client to the authentication server;
the authentication server subjects the client to an authorization routine and issues the session identifier to be appended to the service request to the first server;
the client forwards the service request appended with the session identifier to the first server; and
the first server recognizes the session identifier and services the service request to the client; and
the client appends the session identifier to subsequent service requests to the server system and is serviced without further authorization.

14. A method as claimed in claim 13 wherein the session identifier includes a user identifier.

15. A method as claimed in claim 13 wherein the session identifier includes an expiration time for the session.

16. A method as claimed in claim 13 wherein the session identifier provides access to a protected domain to which the session has access authorization.

17. A method as claimed in claim 16 wherein the session identifier is modified for access to a different protected domain.

18. A method as claimed in claim 13 wherein the session identifier provides a key identifier for key management.

19. A method as claimed in claim 13 wherein the server system records information from the session identifier in a transaction log in the server system.

20. The method of claim 1 wherein the access rights of the client are fully contained within the session identifier.

21. A method as claimed in claim 1 wherein a service request is for a document and the session identifier includes a user identification, further comprising:
returning the requested document wherein the document is customized for a particular user based on the user identification of the session identifier.

22. A method as claimed in claim 1 wherein a service request is for a document which has been purchased by a user, the session identifier comprises an authorization identifier, and further comprising:
returning the requested document if the authorization identifier indicates that the user is authorized to access the document.

23. A method as claimed in claim 1 wherein a service request is for a document wherein the session identifier comprises a user identifier, and further comprising:
returning the requested document to the client; and
charging the user identified in the identifier for access to the document.

24. The method of claim 1, wherein at least one service request comprises a request for a document which has been purchased by a user, and wherein the session identifier comprises an authorization identifier, the method further comprising:
returning the requested document if the authorization identifier indicates that the user is authorized to access the document.

25. A method as claimed in claim 24, wherein the authorization identifier is encoded within a session identifier which is appended to the request.

26. The method of claim 24 wherein the authorization identifier is provided by authentication server.

27. The method of claim 24, further comprising:
identifying the user from the authorization identifier; and
automatically charging the identified user for the document.

28. The method of claim 24, wherein the document is returned electronically.

29. The method of claim 24, wherein a physical copy of the document is sent.

30. The method of claim 24, wherein the authorization identifier in appended to uniform resource locator.

31. The method of claim 1, wherein at least one service request comprises a request for a document, wherein the session identifier is designated by the server system, said method further comprising the steps of:
returning the requested document to the client; and
charging the user identified in the session identifier for access to the document.

32. A method as claimed in claim 31, wherein a user identifier is encoded within a session identifier which is appended to the request.

33. The method of claim 1 wherein the session identifier is cryptographically generated.

34. The method of claim 1 further comprising:
returning a response to the client, the response redirecting an initial service request to an authentication server, the authentication server providing the session identifier.

35. The method of claim 1, wherein the session identifier is appended to at least one path name in a document returned by the server system.

36. The method of claim 35, wherein the at least one path name is in a link in the returned document.

37. The method of claim 36 wherein the link is an absolute link.

38. The method of claim 36 wherein the link comprises a uniform resource locator.

39. The method of claim 35 wherein the step of appending the session identifier comprises filtering the requested document.

40. The method of claim 35 wherein the session identifier is cryptographically generated.

41. The method of claim 35 wherein the session identifier is directed to an accessible domain.

42. The method of claim 35 wherein the session identifier comprises an expiration time.

43. The method of claim 35 wherein the session identifier comprises a date.

44. The method of claim 35 wherein the session identifier comprises a key identifier.

45. The method of claim 35 wherein the session identifier comprises an address of the client.

46. The method of claim 35 wherein the session identifier comprises a digital signature.

47. The method of claim 1, wherein the session identifier is designated by the server system, furthers comprising the steps of:
validating, at the server system, the appended session identifier; and
returning a controlled document if the appended session identifier is valid.

48. The method of claim 47 wherein the session identifier is cryptographically generated.

49. The method of claim 47 wherein the session identifier is directed to an accessible domain.

50. The method of claim 47 wherein the session identifier comprises an expiration time.

51. The method of claim 47 wherein the session identifier comprises a date.

52. The method of claim 47 wherein the session identifier comprises a key identifier.

53. The method of claim 47 wherein the session identifier comprises an address of the client.

54. The method of claim 47 wherein the session identifier comprises an unforgeable digital signature.

55. The method of claim 47 wherein the session identifier facilitates authenticated accesses across multiple content servers.

56. The method of claim 47 wherein the document is customized for a particular user based on a user identification of the session identifier.

57. The method of claim 47, wherein the session identifier is appended to at least one path name in a document returned by the server system.

58. The method of claim 57 wherein the step of appending the session identifier comprises filtering the requested document.

59. The method of claim 1, further comprising:
servicing a request; and
automatically charging a user identified by the session identifier for the service provided.

60. The method of claim 1, wherein at least one service request comprises a purchase request, the purchase request including an associated user identifier, the method further comprising:
accessing, upon receipt of the purchase request at the server system, user information associated with the user identifier sufficient to charge to an account associated with the user, the purchase price of the product identified by the purchase request;
charging the user for the product identified by the purchase request according to the user information; and
fulfilling the purchase request based on the user information.

61. The method of claim 60, wherein the client includes the user identifier in a session identifier appended to the purchase request.

62. The method of claim 1, further comprising:
under control of a client system, displaying information identifying a product; and
in response to a user selection of a hyperlink associated with a product desired to be purchased, sending a request to purchase the item along with an identifier of a purchaser of the item to a server system; and
under control of the server system, upon receiving the request, retrieving additional information previously stored for the purchaser identified by the identifier in the received request;
charging the user the purchase price of the product; and
fulfilling the request for the product.

63. The method of claim 1, wherein the session identifier is appended by the client.

64. The method of claim 63, wherein the session identifier is cryptographically generated.

65. The method of claim 1, wherein a service request comprises a request to purchase a product.

66. The method of claim 65, wherein the product is transmitted over the network.

67. The method of claim 66, wherein the product is a newspaper/newsletter article.

68. The method of claim 65, wherein the product is a durable product.

69. An information system on a network, comprising:
means for receiving service requests from a client and for determining whether a service request includes a session identifier, wherein communications to and from the client are according to hypertext transfer protocol;
means for providing the session identifier in response to an initial service request from the client in a session of requests;
means for storing, at the client, the session identifier for use in each communication to the server system;
means for appending the stored session identifier to each of subsequent communications from the client to the server system; and
means for servicing the subsequent service requests.

70. The information system of claim 69 wherein access rights of the client are fully contained within the session identifier.

71. An information system as claimed in claim 69 wherein the means for providing the session identifier is in a server system which services the requests.

72. An information system as claimed in claim 69 further comprising an authorization routine for authorizing the client prior to issuing the session identifier and means for protecting the session identifier from forgery.

73. An information server system as claimed in claim 69 further comprising a transaction log for recording information from the session identifier.

74. An information system as claimed in claim 69 further comprising means for tracking access history of sequences of service requests within the session of requests.

75. An information system as claimed in claim 69 further comprising means for counting requests to particular services exclusive of repeated requests from a common client.

76. An information system as claimed in claim 69 further comprising a data base relating customer information to access patterns.

77. An information system as claimed in claim 76 wherein the information includes customer demographics.

78. A method of processing, in a server system, service requests from a client to the server system through a network, said method comprising the steps of:
receiving, from the client, a service request to which a session identifier stored at the client has been appended by the client, wherein communications between the client and server system are according to hypertext transfer protocol;
validating the session identifier appended to the service request; and servicing the service request if the appended session identifier is valid.

79. The method of claim 78, further comprising, in the server system:
receiving an initial service request from the client;
creating, responsive to the initial service request, the session identifier; and
returning the session identifier to the client for storage by the client for use in subsequent distinct requests to the server system.

* * * * *

(12) EX PARTE REEXAMINATION CERTIFICATE (8600th)

United States Patent
Levergood et al.

(10) Number: US 7,272,639 C1
(45) Certificate Issued: Oct. 4, 2011

(54) INTERNET SERVER ACCESS CONTROL AND MONITORING SYSTEMS

(75) Inventors: Thomas Mark Levergood, Hopkinton, MA (US); Lawrence C. Stewart, Burlington, MA (US); Stephen Jeffrey Morris, Westford, MA (US); Andrew C. Payne, Lincoln, MA (US); George Winfield Treese, Newton, MA (US)

(73) Assignee: Soverain Software LLC, Chicago, IL (US)

Reexamination Request:
No. 90/011,444, Jan. 18, 2011

Reexamination Certificate for:
Patent No.: 7,272,639
Issued: Sep. 18, 2007
Appl. No.: 09/005,479
Filed: Jan. 12, 1998

Related U.S. Application Data

(63) Continuation of application No. 08/474,096, filed on Jun. 7, 1995, now Pat. No. 5,708,780.

(51) Int. Cl.
*G06F 15/16* (2006.01)

(52) U.S. Cl. .................... 709/218; 709/203; 709/229

(58) Field of Classification Search .............. 395/200.3
See application file for complete search history.

(56) References Cited

U.S. PATENT DOCUMENTS

| 4,799,156 A | 1/1989 | Shavit et al. |
| 5,319,542 A | 6/1994 | King, Jr. et al. |
| 5,694,546 A | 12/1997 | Reisman |

OTHER PUBLICATIONS

Tom Thompson, "CBIS Net Bios Programmer's Reference", 1988.
Charles Bowen, David Peyton, "How to Get the Most Out of CompuServe", Revised Third Edition, 1987.
Tim Berners–Lee, "Hypertext Transfer Protocol (HTTP)", Nov. 5, 1993.

*Primary Examiner* — Woo H. Choi

(57) ABSTRACT

This invention relates to methods for controlling and monitoring access to network servers. In particular, the process described in the invention includes client-server sessions over the Internet. In this environment, when the user attempts to access an access-controlled file, the server subjects the request to a secondary server which determines whether the client has an authorization or valid account. Upon such verification, the user is provided with a session identification which allows the user to access to the requested file as well as any other files within the present protection domain.

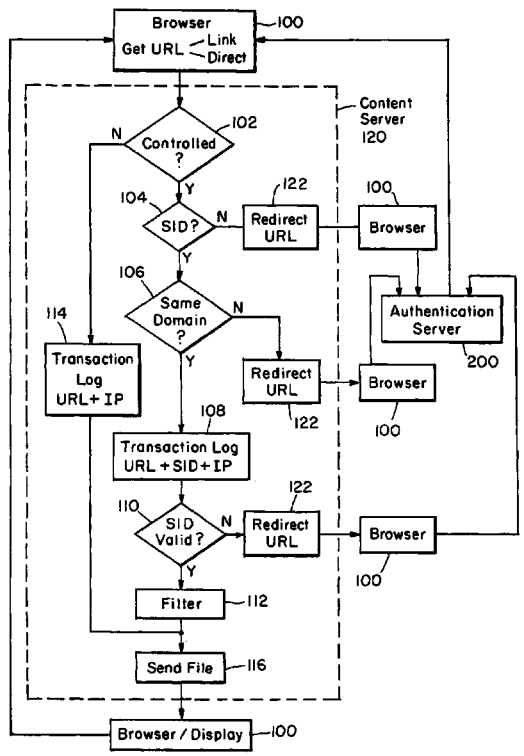
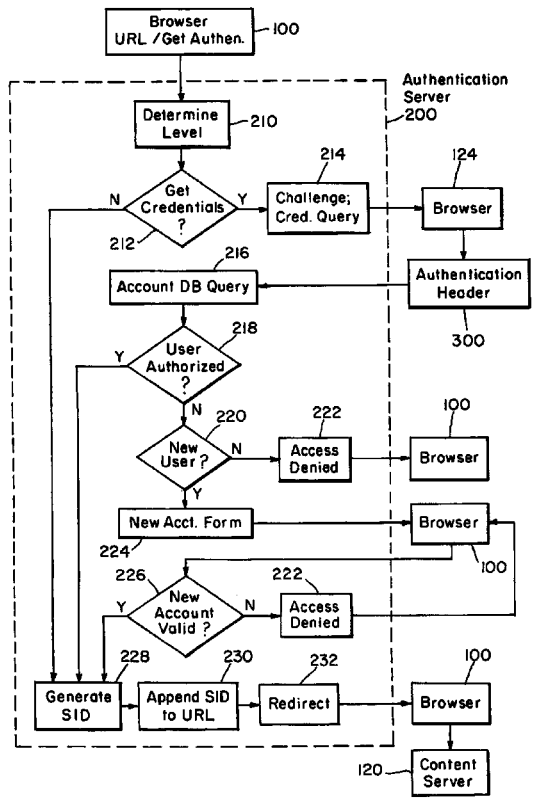

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 10, 60, 65, 68, 69, 78 and 79 is confirmed.

Claims 2-9, 11-59, 61-64, 66, 67 and 70-77 were not reexamined.

\* \* \* \* \*

US007272639C2

(12) EX PARTE REEXAMINATION CERTIFICATE (9503rd)
United States Patent
Levergood et al.

(10) Number: US 7,272,639 C2
(45) Certificate Issued: *Feb. 1, 2013

(54) INTERNET SERVER ACCESS CONTROL AND MONITORING SYSTEMS

(75) Inventors: Thomas Mark Levergood, Hopkinton, MA (US); Lawrence C. Stewart, Burlington, MA (US); Stephen Jeffrey Morris, Westford, MA (US); Andrew C. Payne, Lincoln, MA (US); George Winfield Treese, Newton, MA (US)

(73) Assignee: Soverain Software LLC, Chicago, IL (US)

Reexamination Request:
No. 90/011,937, Sep. 30, 2011

Reexamination Certificate for:
Patent No.: 7,272,639
Issued: Sep. 18, 2007
Appl. No.: 09/005,479
Filed: Jan. 12, 1998

Reexamination Certificate C1 7,272,639 issued Oct. 4, 2011

(*) Notice: This patent is subject to a terminal disclaimer.

Related U.S. Application Data

(63) Continuation of application No. 08/474,096, filed on Jun. 7, 1995, now Pat. No. 5,708,780.

(51) Int. Cl.
*G06F 15/16* (2006.01)
(52) U.S. Cl. .................. 709/218; 709/203; 709/229
(58) Field of Classification Search .................. None
See application file for complete search history.

(56) References Cited

To view the complete listing of prior art documents cited during the proceeding for Reexamination Control Number 90/011,937, please refer to the USPTO's public Patent Application Information Retrieval (PAIR) system under the Display References tab.

*Primary Examiner* — Joshua Campbell

(57) ABSTRACT

This invention relates to methods for controlling and monitoring access to network servers. In particular, the process described in the invention includes client-server sessions over the Internet. In this environment, when the user attempts to access an access-controlled file, the server subjects the request to a secondary server which determines whether the client has an authorization or valid account. Upon such verification, the user is provided with a session identification which allows the user to access to the requested file as well as any other files within the present protection domain.

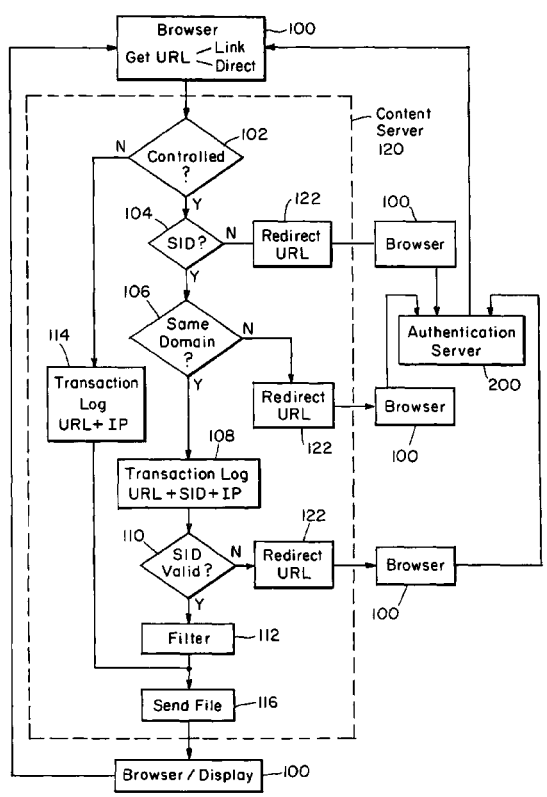

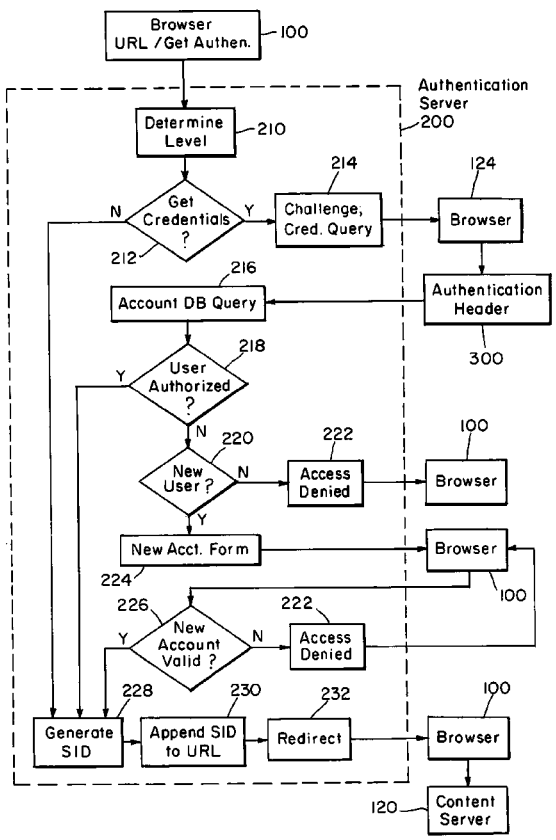

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1, 10, 60, 65, 66, 68, 69 and 79 is confirmed.

Claim 78 is cancelled.

Claims 2-9, 11-59, 61-64, 67 and 70-77 were not reexamined.

* * * * *